United States Patent
Edson et al.

(10) Patent No.: US 10,113,920 B2
(45) Date of Patent: Oct. 30, 2018

(54) THERMOCHROMIC EFFICIENCY INDICATOR

(71) Applicant: Chromatic Technologies, Inc., Colorado Springs, CO (US)

(72) Inventors: Patrick Edson, Denver, CO (US); Timothy J. Owen, Colorado Springs, CO (US); Terrill Scott Clayton, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 14/956,187

(22) Filed: Dec. 1, 2015

(65) Prior Publication Data

US 2016/0153843 A1 Jun. 2, 2016

Related U.S. Application Data

(60) Provisional application No. 62/145,346, filed on Apr. 9, 2015, provisional application No. 62/086,074, filed on Dec. 1, 2014.

(51) Int. Cl.
*G01K 11/12* (2006.01)

(52) U.S. Cl.
CPC .................................. *G01K 11/12* (2013.01)

(58) Field of Classification Search
CPC ...... G01N 31/229; G01N 21/78; G01K 11/12; G01K 11/06; G01K 11/14; G01K 11/16; G01K 11/10
USPC ............... 116/216, 206, 207, 217, 218, 219; 374/E11.018, 106; 436/7
See application file for complete search history.

(56) References Cited

U.S. PATENT DOCUMENTS

| | | | | |
|---|---|---|---|---|
| 4,717,710 A | * | 1/1988 | Shimizu | C09K 9/02 106/311 |
| 6,284,078 B1 | * | 9/2001 | Witonsky | G01K 11/165 116/207 |
| 6,382,125 B1 | * | 5/2002 | Tamura | B41M 5/28 116/207 |

(Continued)

FOREIGN PATENT DOCUMENTS

| | | | | |
|---|---|---|---|---|
| CA | 2863341 A1 | * | 7/2013 | ............. C09D 11/17 |
| EP | 0 294 136 | | 12/1988 | |

OTHER PUBLICATIONS

Non-Patent Literature Hallcrest, "Liquid Crystals", accessed at http://web.archive.org/web/2014109113157/http://www.colorchange.com/liquidcrystals, archived on Oct. 19, 2014.*

(Continued)

*Primary Examiner* — Lisa Caputo
*Assistant Examiner* — Irving A Campbell
(74) *Attorney, Agent, or Firm* — Craig R. Miles; C R Miles P.C.

(57) ABSTRACT

A thermochromic efficiency indicator for indicating efficiency of a temperature affector, and methods of making and using such a thermochromic efficiency indicator, whereby the thermochromic efficiency indicator comprises: a substrate; and a first indicia coupled to the substrate, the first indicia comprising a first thermochromic compound capable of undergoing a first thermochromic compound color change; wherein the first thermochromic compound color change indicates the temperature affector is below a first predetermined efficiency threshold.

23 Claims, 21 Drawing Sheets

(56) References Cited

U.S. PATENT DOCUMENTS

| | | | |
|---|---|---|---|
| 6,544,614 B1* | 4/2003 | Huffer | A61J 9/02 |
| | | | 116/200 |
| 2005/0178314 A1* | 8/2005 | McGuire | G01K 11/12 |
| | | | 116/216 |
| 2007/0212501 A1 | 9/2007 | Wolfe et al. | |
| 2008/0142529 A1* | 6/2008 | LaGuardia | B65D 81/3874 |
| | | | 220/592.2 |
| 2009/0063306 A1 | 3/2009 | Fano et al. | |
| 2011/0253030 A1 | 10/2011 | Lescanec et al. | |
| 2013/0176130 A1 | 7/2013 | Hoesl | |
| 2013/0193204 A1 | 8/2013 | Kerscher et al. | |
| 2014/0210201 A1 | 7/2014 | Owen et al. | |
| 2014/0272161 A1* | 9/2014 | Clayton | C09B 67/0097 |
| | | | 427/424 |
| 2014/0288868 A1* | 9/2014 | Gorham, Jr. | G06Q 10/0833 |
| | | | 702/99 |
| 2015/0047552 A1* | 2/2015 | Ortais | G06Q 10/0833 |
| | | | 702/99 |

OTHER PUBLICATIONS

Non-Patent Literature NDSU, "Determining Insulation and Air Infiltration Levels Using an Infrared Thermometer", accessed at https://www.ag.nsdu.edu/pubs/ageng/structu/ae1373.pdf, Mar. 2010.*
PCT International Patent Application No. PCT/US15/63278; International Search Report and the Written Opinion of the International Searching Authority dated Apr. 19, 2016, total 13 pages.
U.S. Appl. No. 62/086,074, filed Dec. 1, 2014.
U.S. Appl. No. 62/145,346, filed Apr. 9, 2015.

* cited by examiner

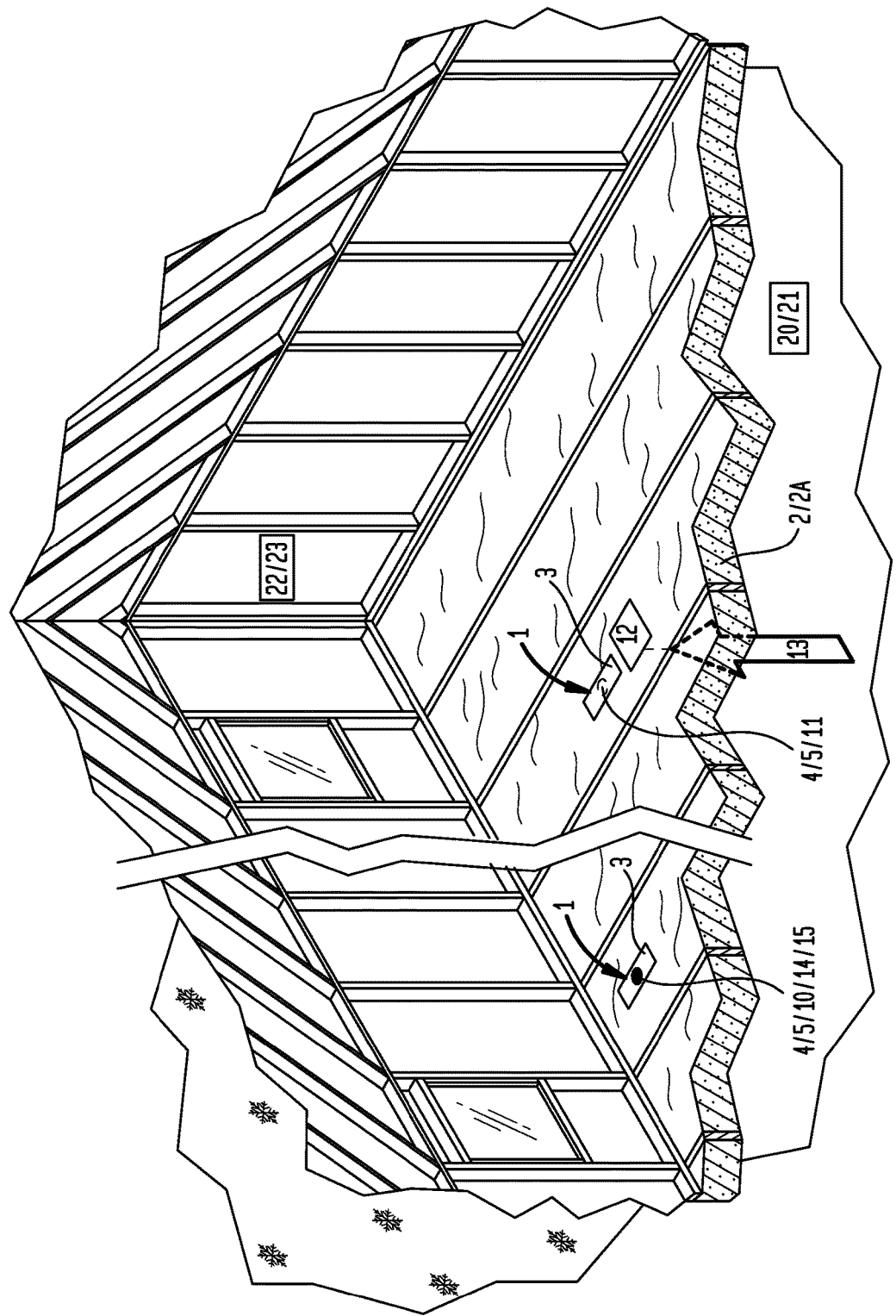

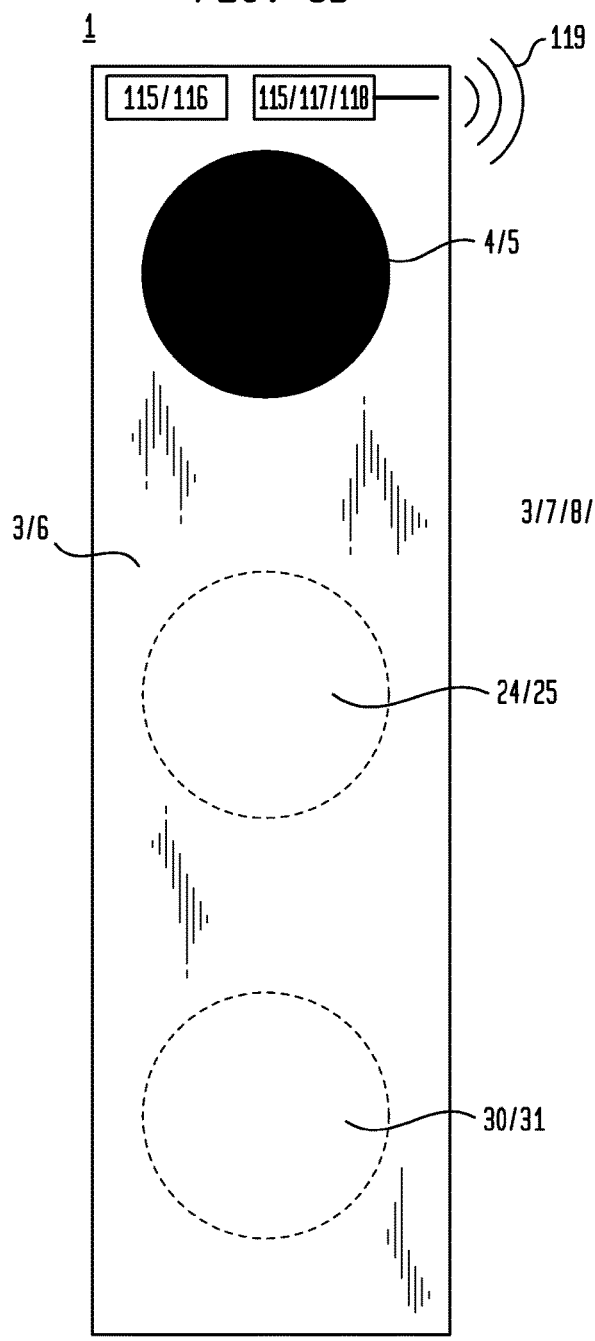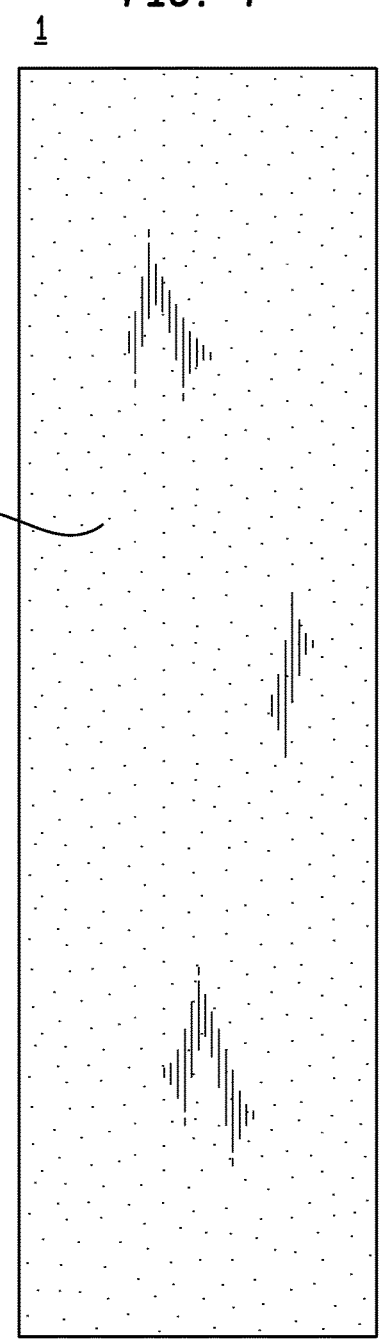

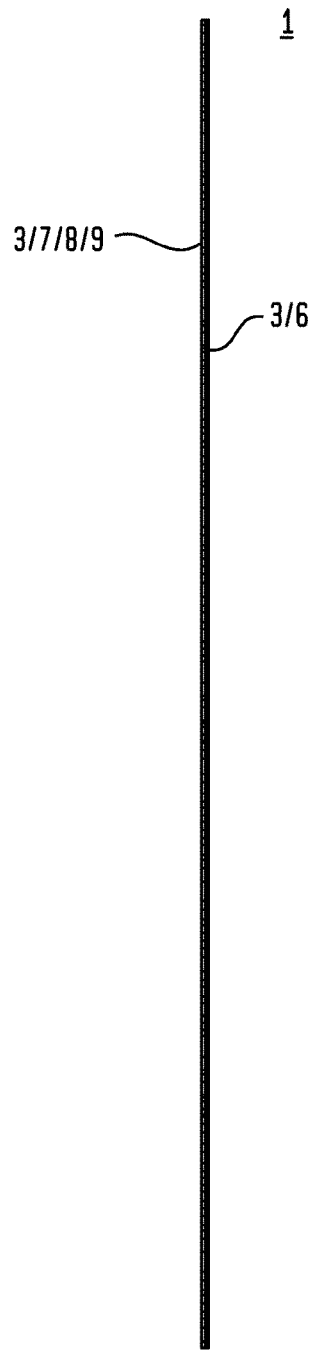
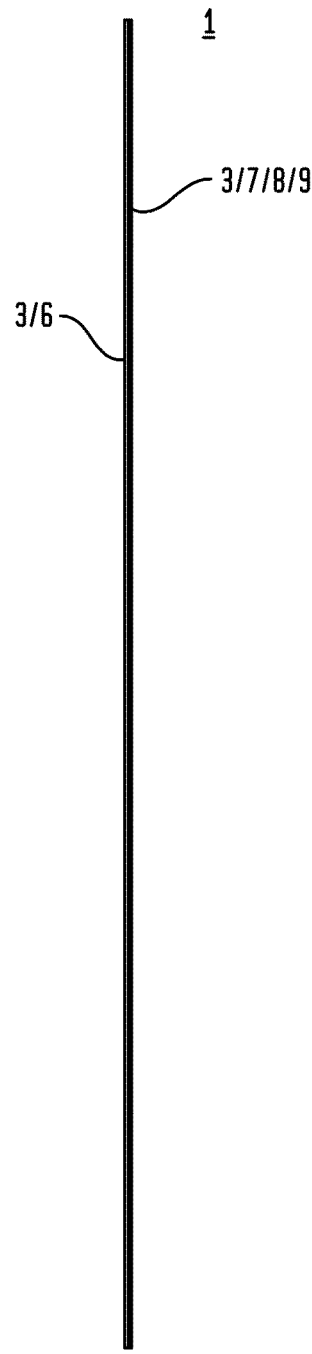
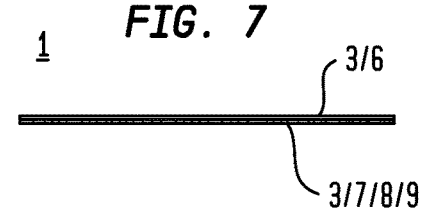
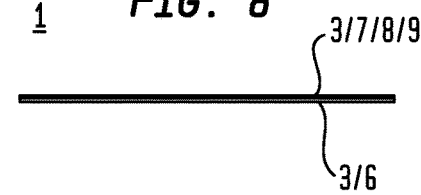

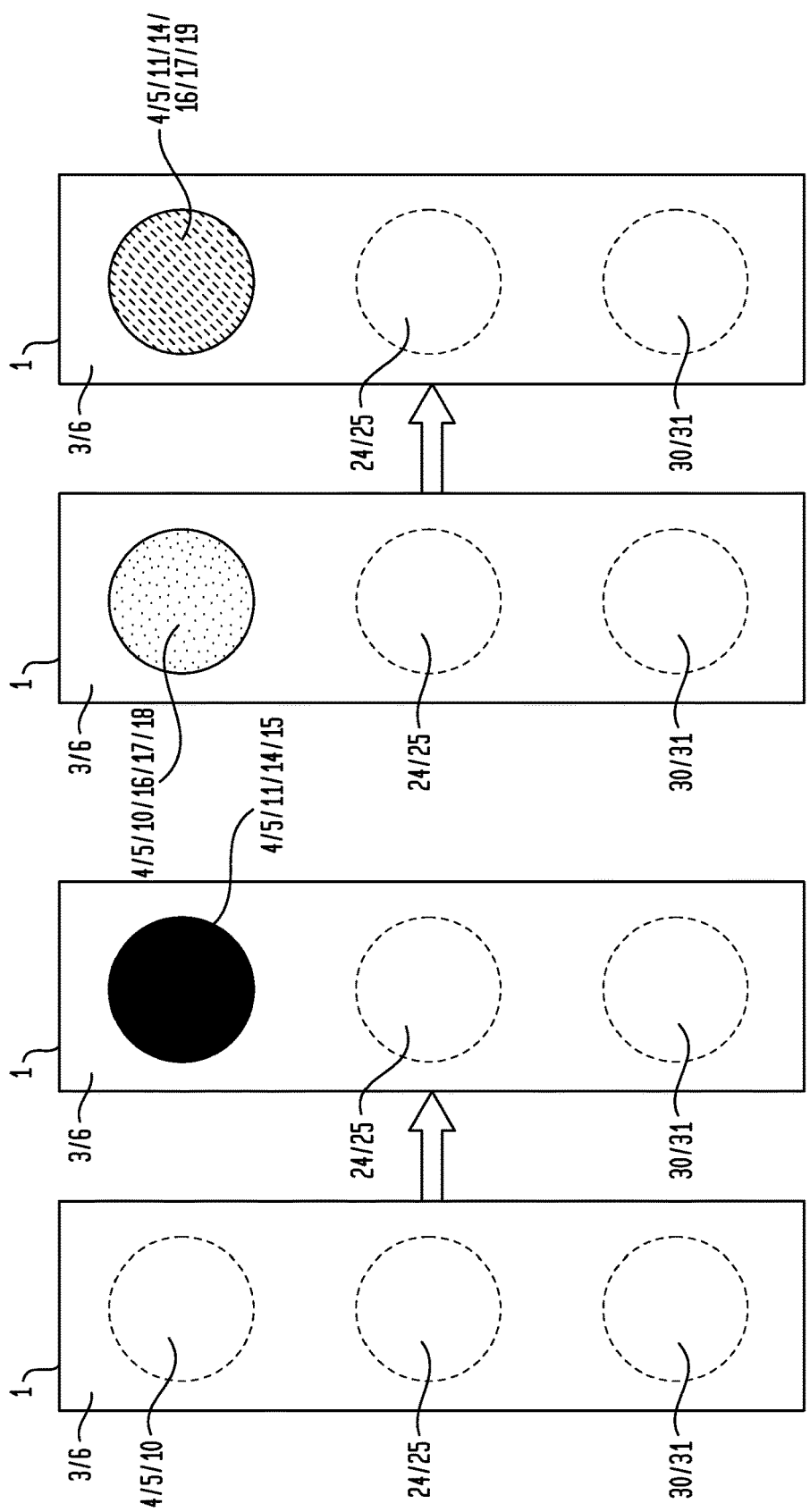

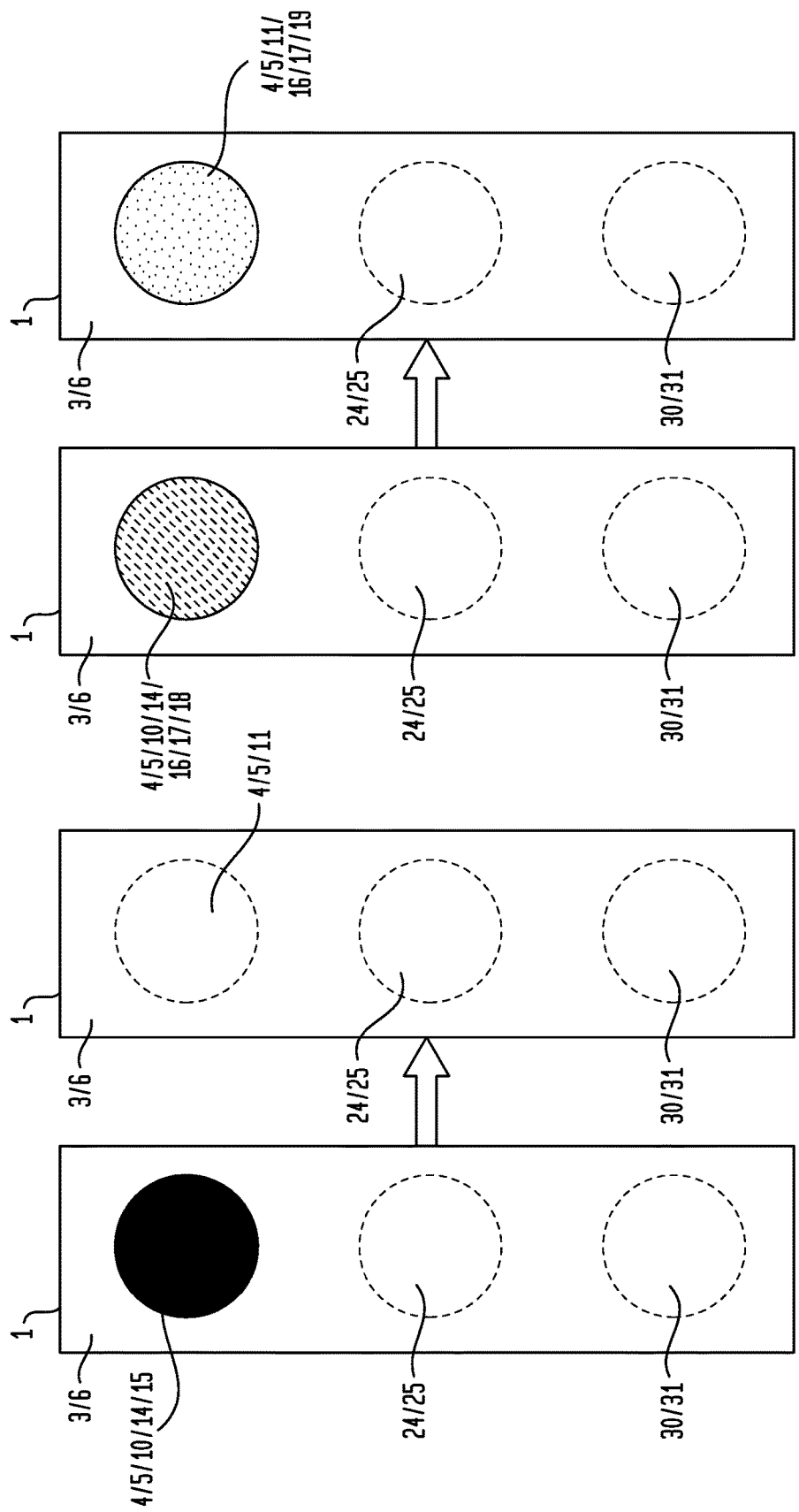

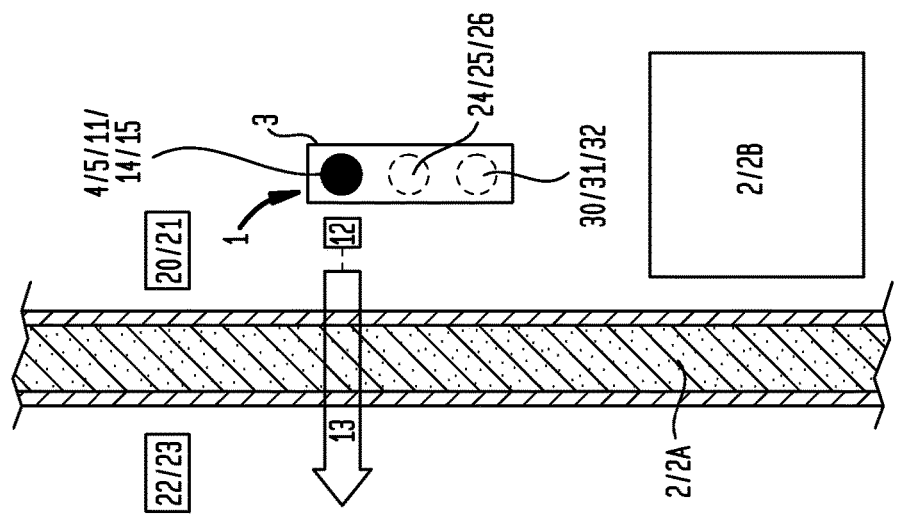
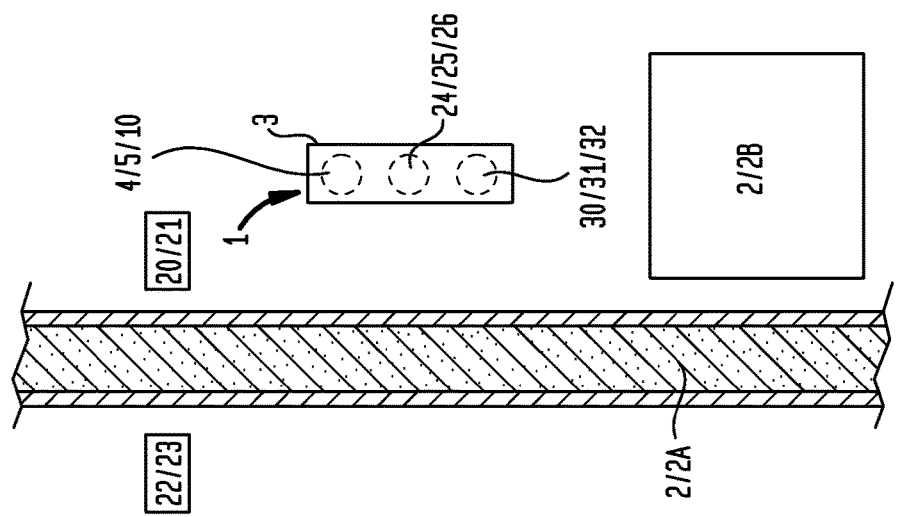

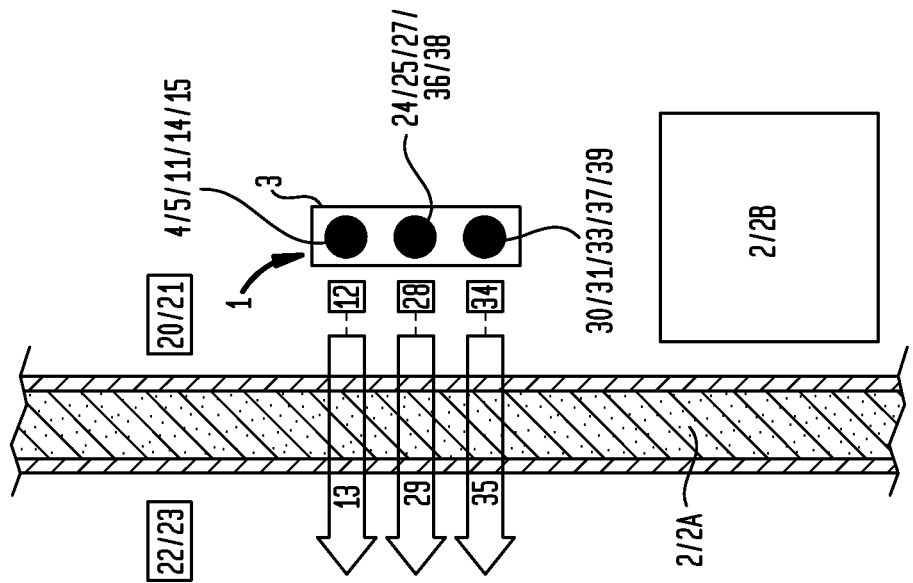
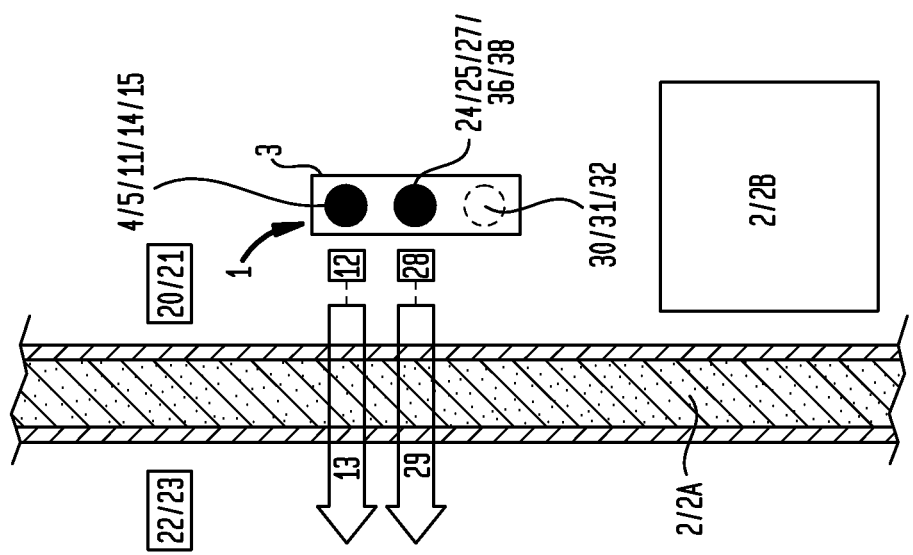

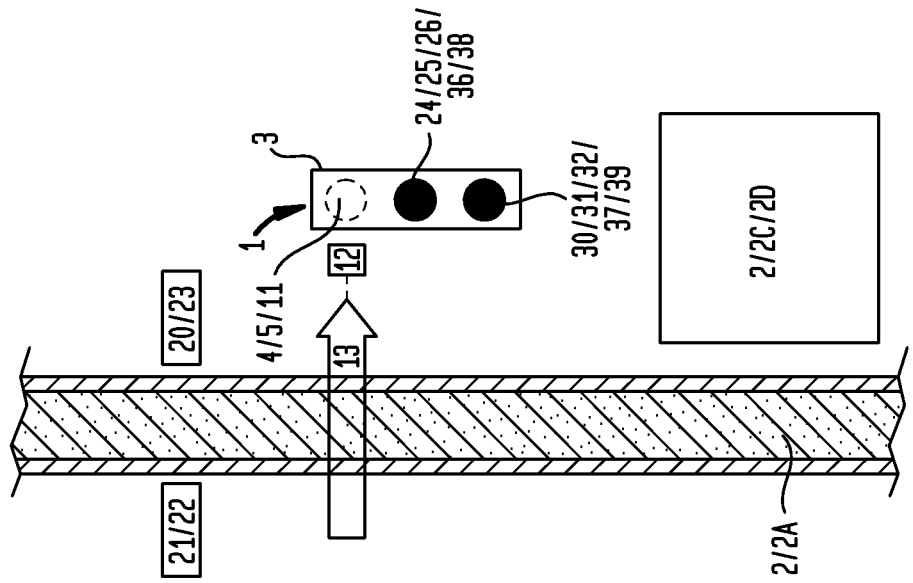
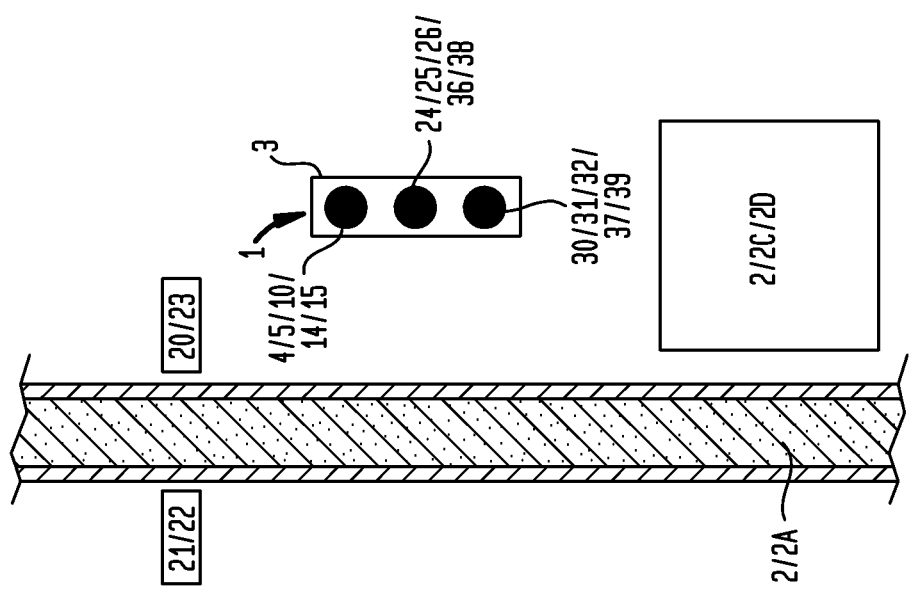

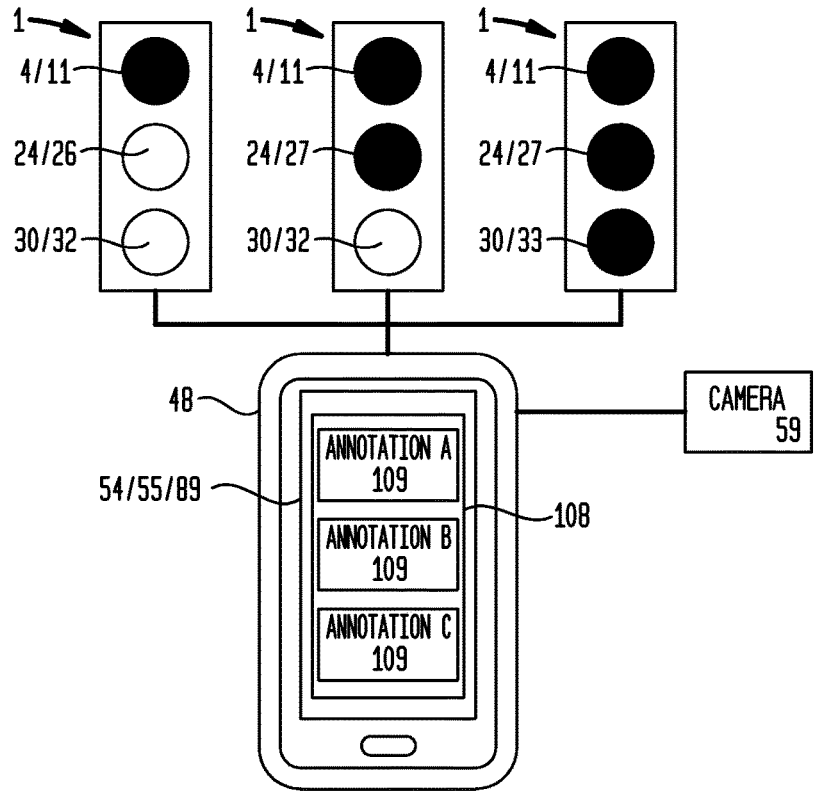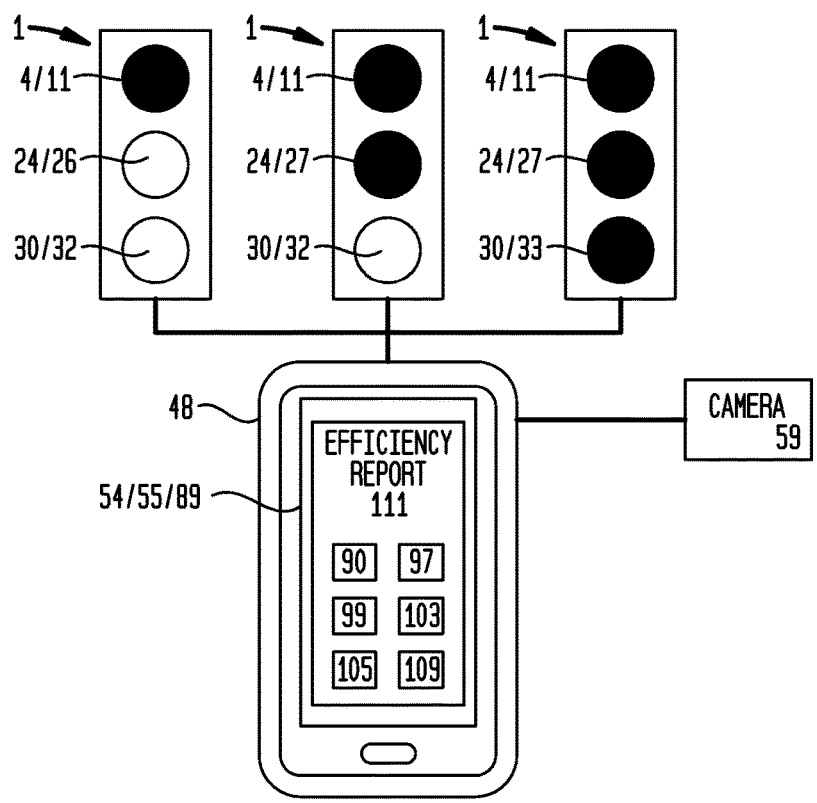

THERMOCHROMIC EFFICIENCY INDICATOR

This United States Non-Provisional patent application claims the benefit of U.S. Provisional Patent Application No. 62/145,346, filed Apr. 9, 2015 and U.S. Provisional Patent Application No. 62/086,074, filed Dec. 1, 2014, each hereby incorporated by reference herein.

I. SUMMARY OF THE INVENTION

A broad object of a particular embodiment of the invention can be to provide a thermochromic efficiency indicator for indicating efficiency of a temperature affector, and methods of making and using such a thermochromic efficiency indicator, whereby the thermochromic efficiency indicator comprises: a substrate; and a first indicia coupled to the substrate, the first indicia comprising a first thermochromic compound capable of undergoing a first thermochromic compound color change; wherein the first thermochromic compound color change indicates the temperature affector is below a first predetermined efficiency threshold.

Another broad object of a particular embodiment of the invention can be to provide the thermochromic efficiency indicator as described above, wherein the first thermochromic compound color change is associated with a first thermochromic compound state change from a first thermochromic compound first state to a first thermochromic compound second state; the first thermochromic compound state change achieved upon exposure of the first thermochromic compound to a first temperature associated with transfer of a first threshold amount of thermal energy; wherein the transfer of the first threshold amount of thermal energy is facilitated at least in part by the temperature affector; and wherein the transfer of the first threshold amount of thermal energy indicates the temperature affector is below the first predetermined efficiency threshold.

Another broad object of a particular embodiment of the invention can be to provide an electronic device for augmenting a thermochromic efficiency indicator, and methods of using such an electronic device, whereby the electronic device comprises: a processor, the processor communicatively coupled to a memory element containing an application program, the application program including: a graphical user interface module executable to display a graphical user interface on a display surface associated with the electronic device; and an efficiency matching module executable to: allow entry of an indicated efficiency of a temperature affector via the graphical user interface, the indicated efficiency indicated by the thermochromic efficiency indicator; and display on the display surface one or more options relating to the temperature affector, each option matched to the indicated efficiency.

Naturally, further objects of the invention are disclosed throughout other areas of the specification, drawings, and claims.

II. A BRIEF DESCRIPTION OF THE DRAWINGS

FIG. 1C is an illustration of a method of using a particular embodiment of a thermochromic efficiency indicator disposed within a space having a temperature affected by the temperature affector, whereby the temperature affector functions to insulate a first space having a greater temperature from a second space having a lesser temperature.

FIG. 3B is a front view of the particular embodiment of the thermochromic efficiency indicator shown in FIG. 3A.

FIG. 4 is a rear view of the particular embodiment of the thermochromic efficiency indicator shown in FIG. 3A.

FIG. 5 is a first side view of the particular embodiment of the thermochromic efficiency indicator shown in FIG. 3A.

FIG. 6 is a second side view of the particular embodiment of the thermochromic efficiency indicator shown in FIG. 3A.

FIG. 7 is a first end view of the particular embodiment of the thermochromic efficiency indicator shown in FIG. 3A.

FIG. 8 is a second end view of the particular embodiment of the thermochromic efficiency indicator shown in FIG. 3A.

Figure 1A:
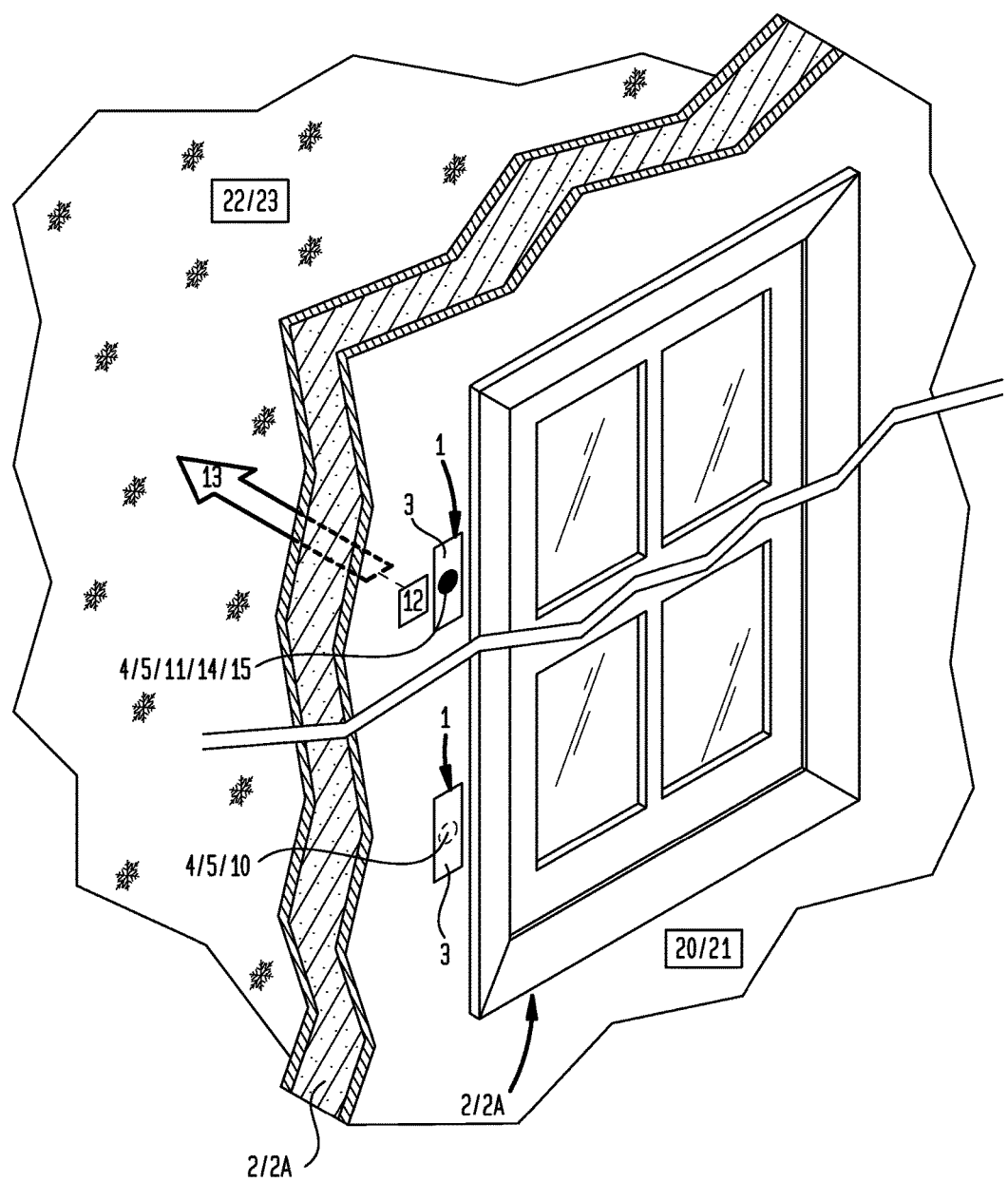
FIG. 1A is an illustration of a method of using a particular embodiment of a thermochromic efficiency indicator disposed within a space having a temperature affected by the temperature affector, whereby the temperature affector functions to insulate a first space having a greater temperature from a second space having a lesser temperature.

FIG. 9A is a front view of a particular embodiment of a thermochromic efficiency indicator having an indicia, whereby the indicia can be substantially colorless when a thermochromic compound in a thermochromic compound first state is substantially colorless, and the indicia can exhibit an indicia color when the thermochromic compound in a thermochromic compound second state exhibits a thermochromic compound color. Accordingly, exhibition of the indicia color indicates a temperature affector is below a predetermined efficiency threshold.

FIG. 9B is a front view of a particular embodiment of a thermochromic efficiency indicator having an indicia, whereby the indicia can include an indicia first color which includes a combination of a substantially colorless thermochromic compound and a colorant color of a colorant when the thermochromic compound is in a thermochromic compound first state, and the indicia can exhibit an indicia second color which includes a combination of a thermochromic compound color and the colorant color when the thermochromic compound is in the thermochromic compound second state. Accordingly, exhibition of the indicia second color indicates a temperature affector is below a predetermined efficiency threshold.

FIG. 9C is a front view of a particular embodiment of a thermochromic efficiency indicator having an indicia, whereby the indicia can exhibit an indicia color when a thermochromic compound in a thermochromic compound first state exhibits a thermochromic compound color, and the indicia can be substantially colorless when the a thermochromic compound in a thermochromic compound second state is substantially colorless. Accordingly, exhibition of a substantially colorless indicia indicates a temperature affector is below a predetermined efficiency threshold.

FIG. 9D is a front view of a particular embodiment of a thermochromic efficiency indicator having an indicia, whereby the indicia can exhibit an indicia first color which includes a combination of a thermochromic compound color and a colorant color of a colorant when the thermochromic compound is in a thermochromic compound first state, and the indicia can exhibit an indicia second color which includes a combination of a substantially colorless thermochromic compound and the colorant color when the thermochromic compound is in a thermochromic compound second state. Accordingly, exhibition of the indicia second color indicates a temperature affector is below a predetermined efficiency threshold.

FIG. 10A is an illustration of a particular embodiment of a thermochromic efficiency indicator disposed within a space having a temperature affected by the temperature affector, whereby the temperature affector functions to provide a first space with a greater temperature than a second space having a lesser temperature. The thermochromic efficiency indicator indicates the temperature affector is at least at first, second, and third predetermined efficiency thresholds.

FIG. 10B is an illustration of a particular embodiment of a thermochromic efficiency indicator disposed within a space having a temperature affected by the temperature affector, whereby the temperature affector functions to provide a first space with a greater temperature than a second space having a lesser temperature. The thermochromic efficiency indicator indicates the temperature affector is below a first predetermined efficiency threshold and is at least at second and third predetermined efficiency thresholds.

FIG. 10C is an illustration of a particular embodiment of a thermochromic efficiency indicator disposed within a space having a temperature affected by the temperature affector, whereby the temperature affector functions to provide a first space with a greater temperature than a second space having a lesser temperature. The thermochromic efficiency indicator indicates the temperature affector is below first and second predetermined efficiency thresholds and is at least at a third predetermined efficiency threshold.

FIG. 10D is an illustration of a particular embodiment of a thermochromic efficiency indicator disposed within a space having a temperature affected by the temperature affector, whereby the temperature affector functions to provide a first space with a greater temperature than a second space having a lesser temperature. The thermochromic efficiency indicator indicates the temperature affector is below first, second, and third predetermined efficiency thresholds.

FIG. 11A is an illustration of a particular embodiment of a thermochromic efficiency indicator disposed within a space having a temperature affected by the temperature affector, whereby the temperature affector functions to provide a first space with a lesser temperature than a second space having a greater temperature. The thermochromic efficiency indicator indicates the insulator is at least at first, second, and third predetermined efficiency thresholds.

FIG. 11B is an illustration of a particular embodiment of a thermochromic efficiency indicator disposed within a space having a temperature affected by the temperature affector, whereby the temperature affector functions to provide a first space with a lesser temperature than a second space having a greater temperature. The thermochromic efficiency indicator indicates the insulator is below a first predetermined efficiency threshold and is at least at second and third predetermined efficiency thresholds.

Figure 11C:
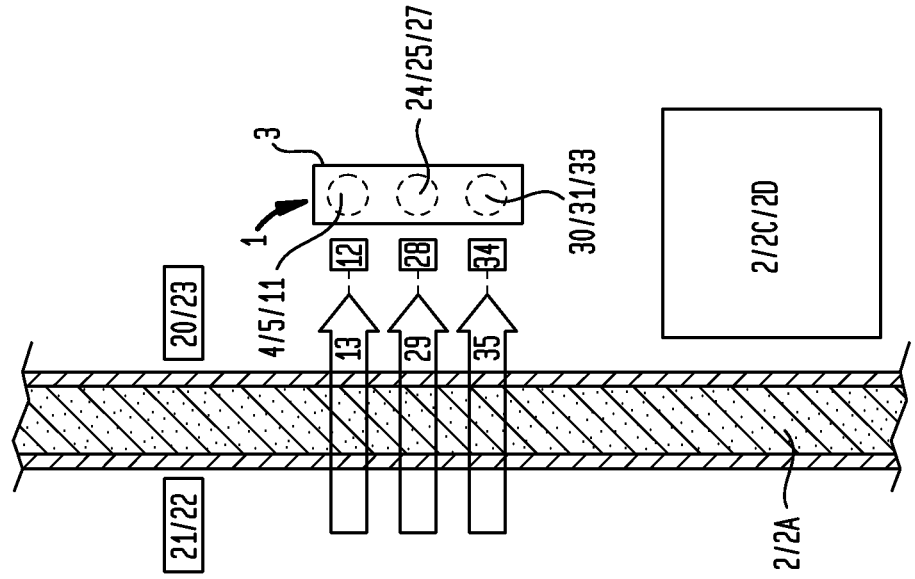

FIG. 11C is an illustration of a particular embodiment of a thermochromic efficiency indicator disposed within a space having a temperature affected by the temperature affector, whereby the temperature affector functions to provide a first space with a lesser temperature than a second space having a greater temperature. The thermochromic efficiency indicator indicates the insulator is below first and second predetermined efficiency thresholds and is at least at a third predetermined efficiency threshold.

Figure 11D:
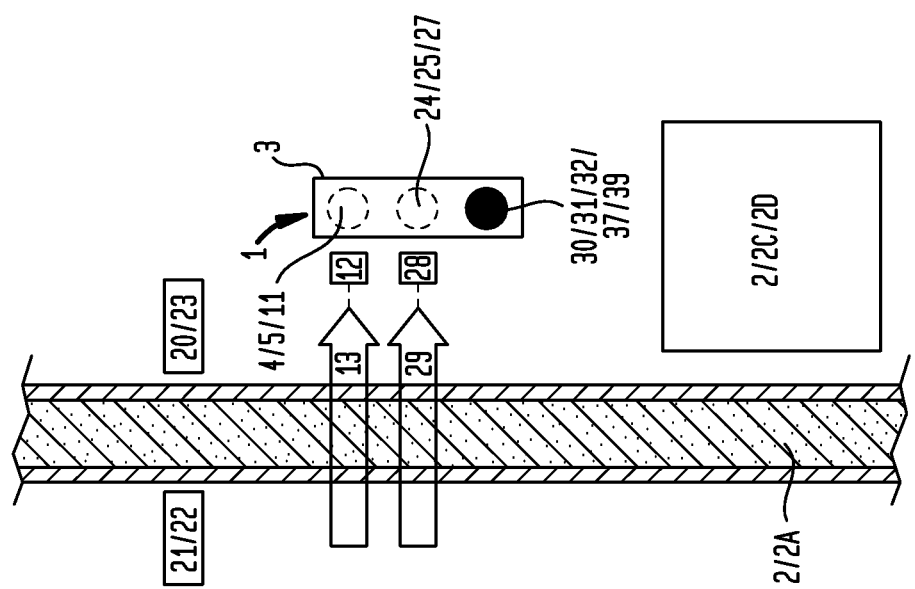

FIG. 11D is an illustration of a particular embodiment of a thermochromic efficiency indicator disposed within a space having a temperature affected by the temperature affector, whereby the temperature affector functions to provide a first space with a lesser temperature than a second space having a greater temperature. The thermochromic efficiency indicator indicates the insulator is below first, second, and third predetermined efficiency thresholds.

Figure 12:
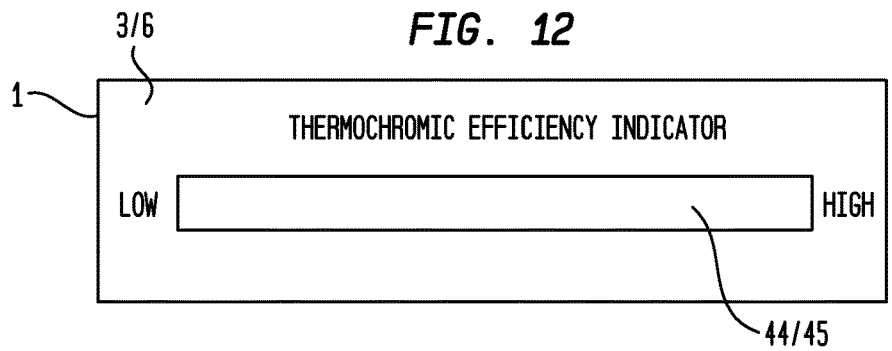

FIG. 12 is a front view of a particular embodiment of a thermochromic efficiency indicator having a continuous indicia configured as a bar-like indicia disposed substantially horizontally on a substrate.

Figure 13A:
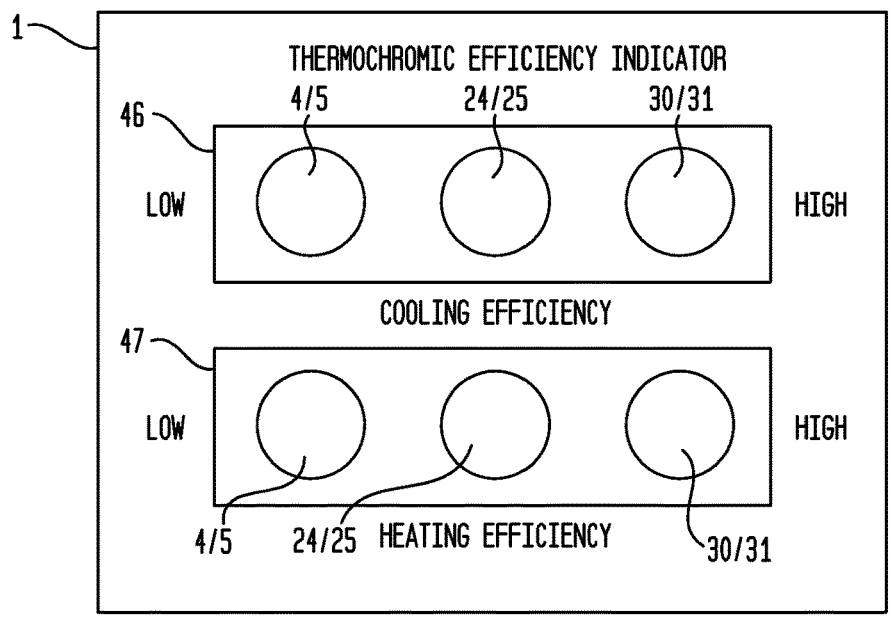

FIG. 13A is a front view of a particular embodiment of a thermochromic efficiency indicator including a first thermochromic efficiency indicator which functions to indicate a cooling efficiency and a second thermochromic efficiency indicator which functions to indicate a heating efficiency, whereby each of first, second, and third indicia within each of the first and second thermochromic efficiency indicators are configured as discrete first, second, and third indicia.

Figure 13B:
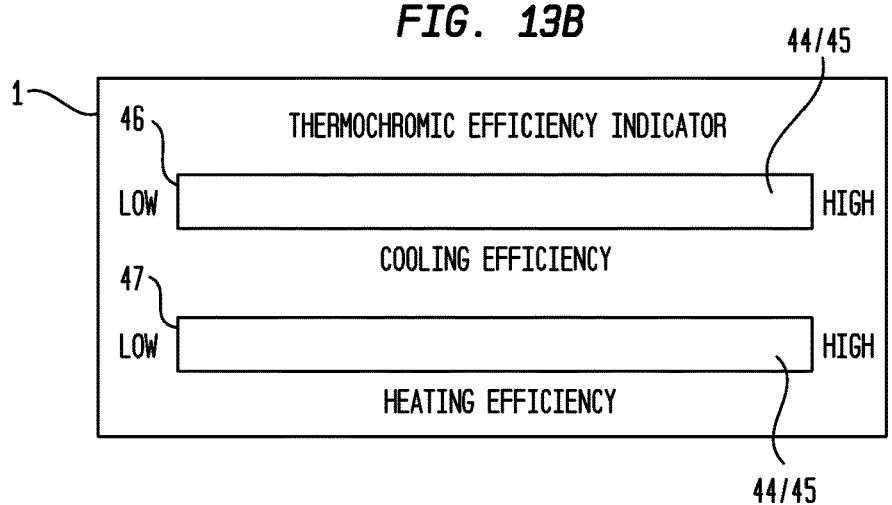

FIG. 13B is a front view of a particular embodiment of a thermochromic efficiency indicator including a first thermochromic efficiency indicator which functions to indicate a cooling efficiency and a second thermochromic efficiency indicator which functions to indicate a heating efficiency, whereby each of the first and second thermochromic efficiency indicators are continuous indicia configured as bar-like indicia.

Figure 14B:
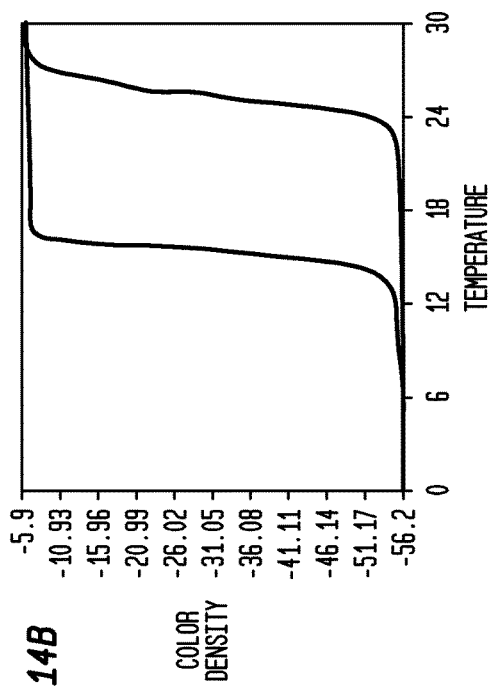
Figure 14D:
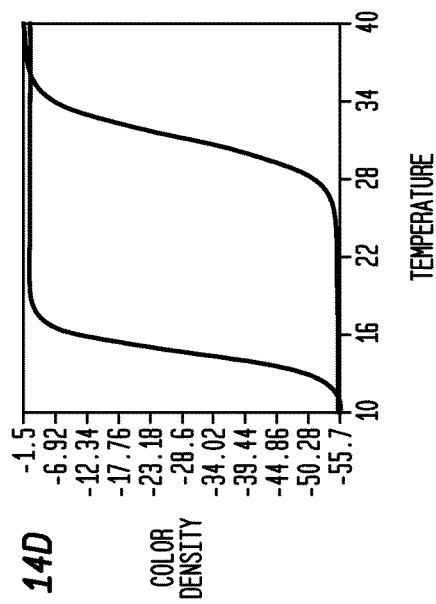
Figure 14A:
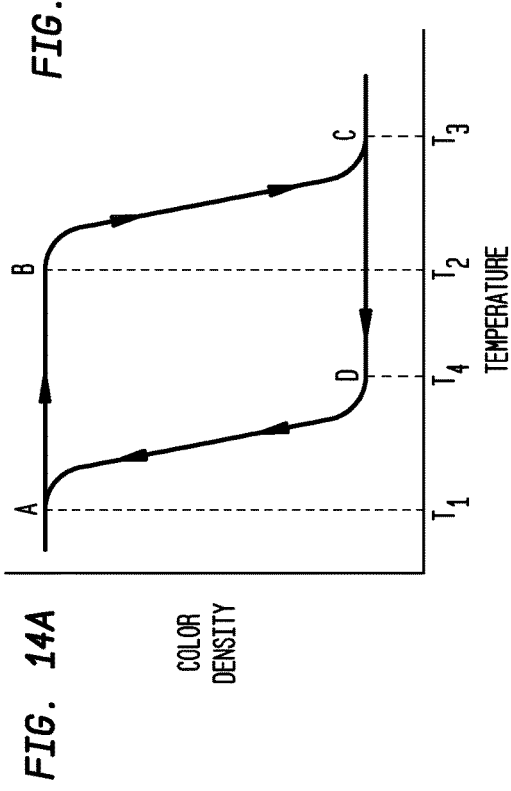

FIG. 14A is an illustration of hysteresis characteristics of a thermochromic system of a particular embodiment of a thermochromic efficiency indicator, the thermochromic system having a color-memory property.

FIG. 14B is an illustration of hysteresis characteristics of a thermochromic system of a particular embodiment of a thermochromic efficiency indicator, the thermochromic system having a color-memory property.

Figure 14C:
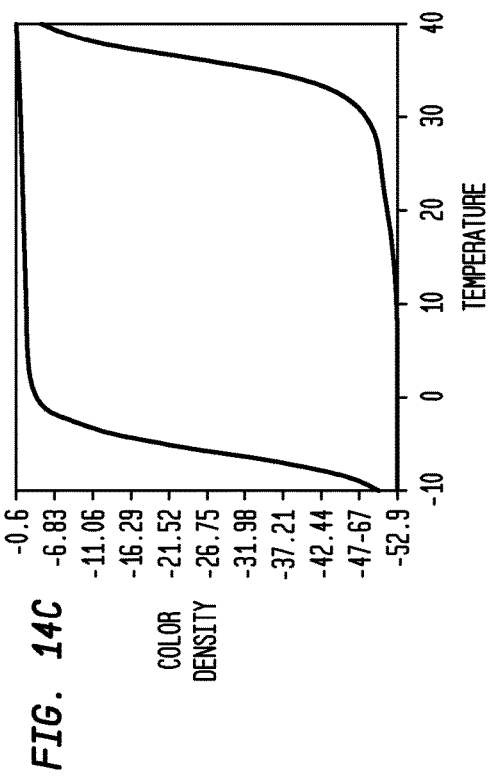

FIG. 14C is an illustration of hysteresis characteristics of a thermochromic system of a particular embodiment of a thermochromic efficiency indicator, the thermochromic system having a color-memory property.

FIG. 14D is an illustration of hysteresis characteristics of a thermochromic system of a particular embodiment of a thermochromic efficiency indicator, the thermochromic system having a color-memory property.

Figure 15:
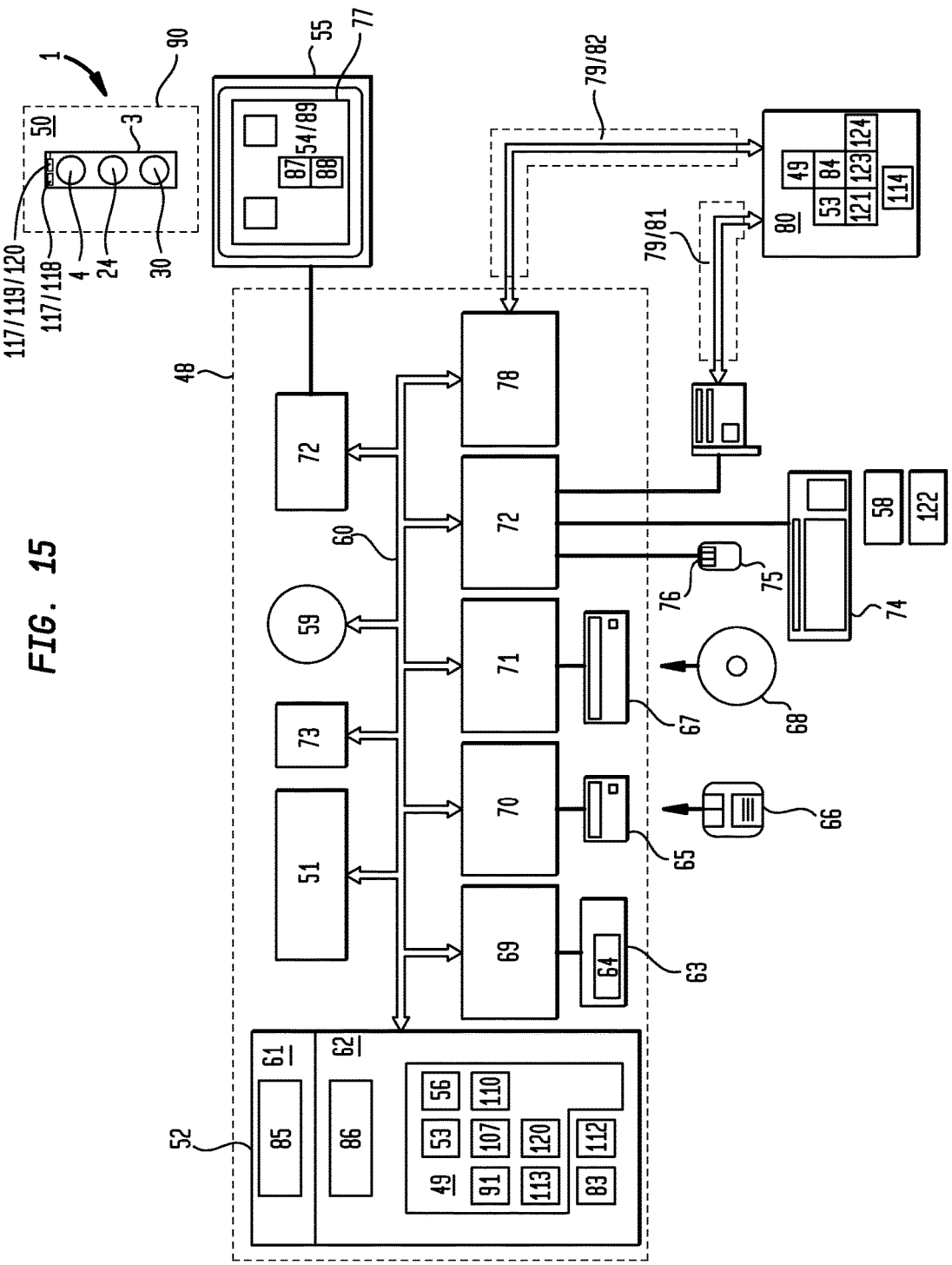

FIG. 15 is a block diagram of an illustrative computer means, network means, and computer-readable medium which provide computer-executable instructions to provide a computer-implemented augmentation to a thermochromic efficiency indicator.

Figure 16:
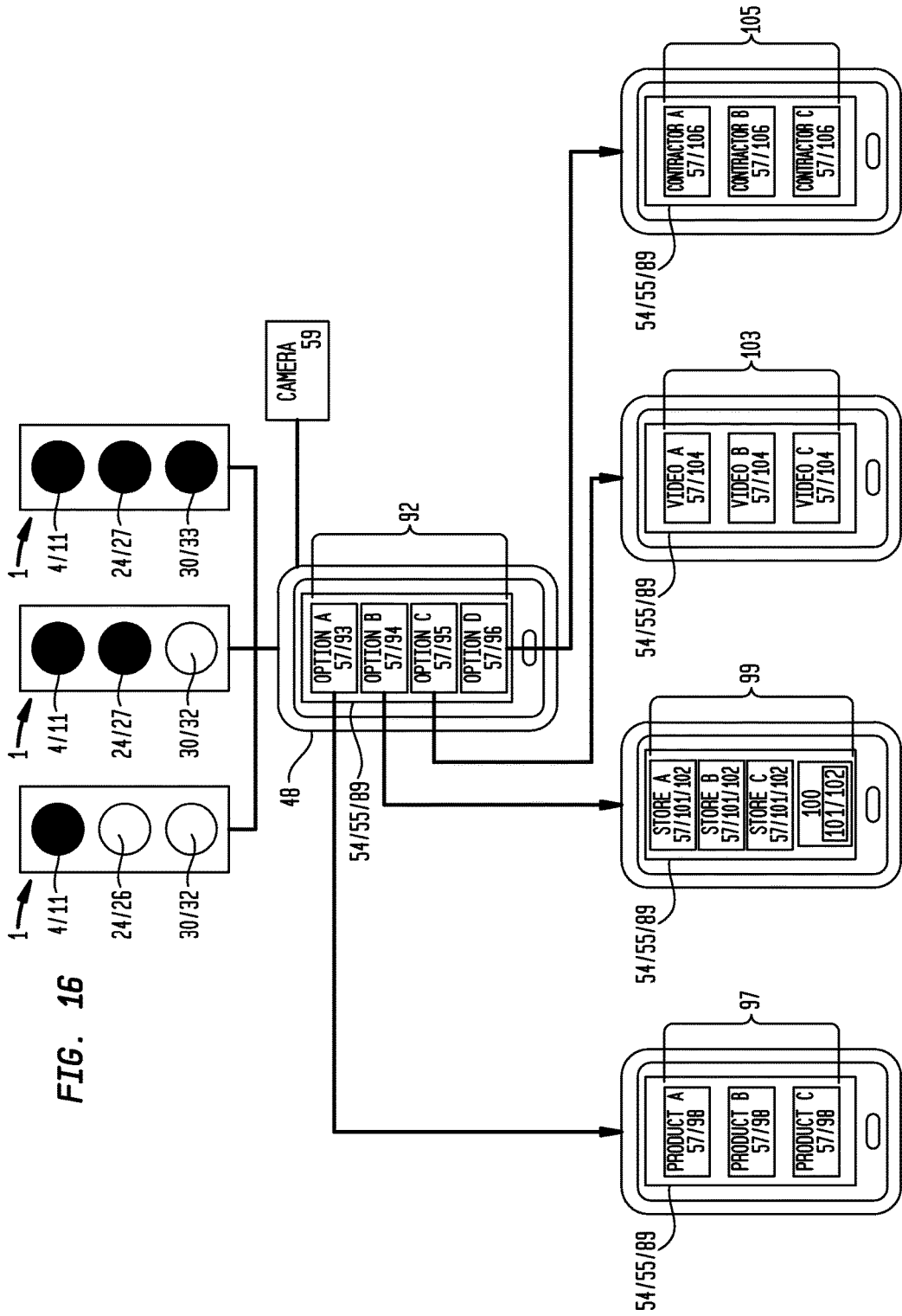

FIG. 16 is an illustrative block flow diagram which provides a general overview of a particular embodiment of the computer-implemented augmentation to a thermochromic efficiency indicator, including graphical user interfaces generated in response to indicia provided by the thermochromic efficiency indicator.

FIG. 17 is an illustrative block flow diagram of a particular embodiment of the computer-implemented augmentation to a thermochromic efficiency indicator, including a graphical user interface which by user interaction generates an annotation field which allows entry of annotations which are retrievably coupled to the thermochromic efficiency indicator.

FIG. 18 is an illustrative block flow diagram of a particular embodiment of the computer-implemented augmentation to a thermochromic efficiency indicator, including a graphical user interface which by user interaction generates an efficiency report.

III. DETAILED DESCRIPTION OF THE PREFERRED EMBODIMENTS

Now referring primarily to FIG. 1A through FIG. 1F, which illustrate methods of using particular embodiments of a thermochromic efficiency indicator (1) for indicating efficiency of a temperature affector (2), whereby the thermochromic efficiency indicator (1) includes a substrate (3) and a first indicia (4) coupled to the substrate (3). The first indicia (4) includes a first thermochromic compound (5) capable of undergoing a first thermochromic compound color change, whereby the first thermochromic compound color change indicates the temperature affector (2) is below a first predetermined efficiency threshold.

Accordingly, the method of use can include disposing the thermochromic efficiency indicator (1) within a space having a temperature which may be affected by the temperature affector (2), and visually observing the first indicia (4) including the first thermochromic compound (5), whereby visual observation of the first thermochromic compound color change indicates the temperature affector (2) is below the first predetermined efficiency threshold.

For the purposes of the present invention, the term "affector" means one that affects something, whether partially or completely, whereby "affect" means to have an influence or effect upon something, whether directly or indirectly.

For the purposes of the present invention, the term "efficiency" means the quality of being efficient, whereby "efficient" means producing or able to produce a desired effect.

For the purposes of the present invention, the term "predetermined" means decided in advance.

For the purposes of the present invention, the term "space" means an area or volume generally defined by one or more boundaries.

Now referring primarily to FIG. 1A through FIG. 1D, as to particular embodiments, the temperature affector (2) can comprise an insulator (2A). Correspondingly, the thermochromic efficiency indicator (1) can be used to indicate efficiency of the insulator (2A), whereby the thermochromic efficiency indicator (1) includes a substrate (3) and a first indicia (4) coupled to the substrate (3), as described above. Thus, the first thermochromic compound color change indicates the insulator (2A) is below a first predetermined efficiency threshold.

For the purposes of the present invention, the term "insulator" means ones that insulates, whereby "insulate" means to separate. As non-limiting examples, an insulator (2A) can comprise a wall, a floor, a ceiling, a window, a door, insulation, or the like, which surrounds, whether partially or completely, a space.

Figure 1B:
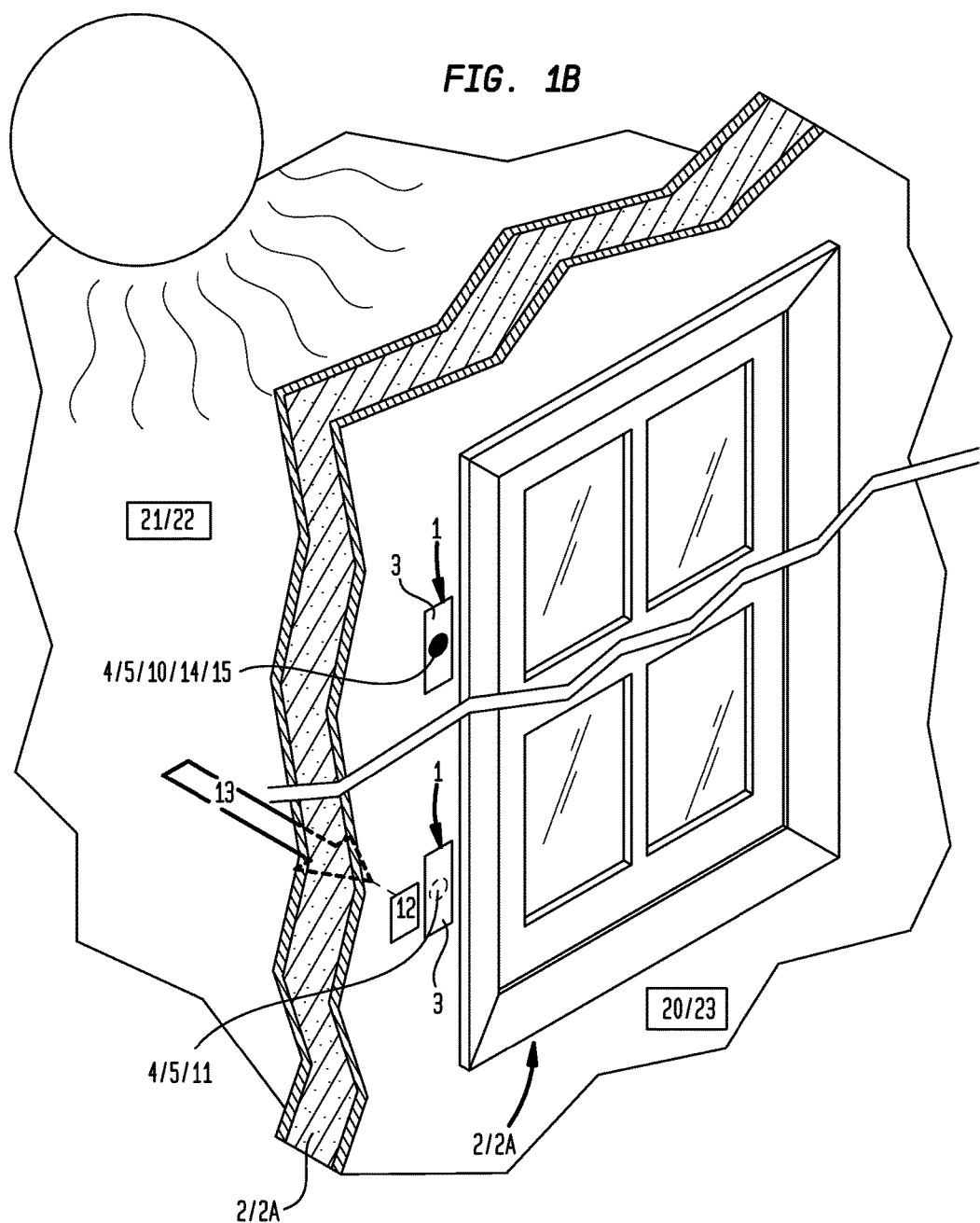
FIG. 1B is an illustration of a method of using a particular embodiment of a thermochromic efficiency indicator disposed within a space having a temperature affected by the temperature affector, whereby the temperature affector functions to insulate a first space having a lesser temperature from a second space having a greater temperature.
Figure 1D:
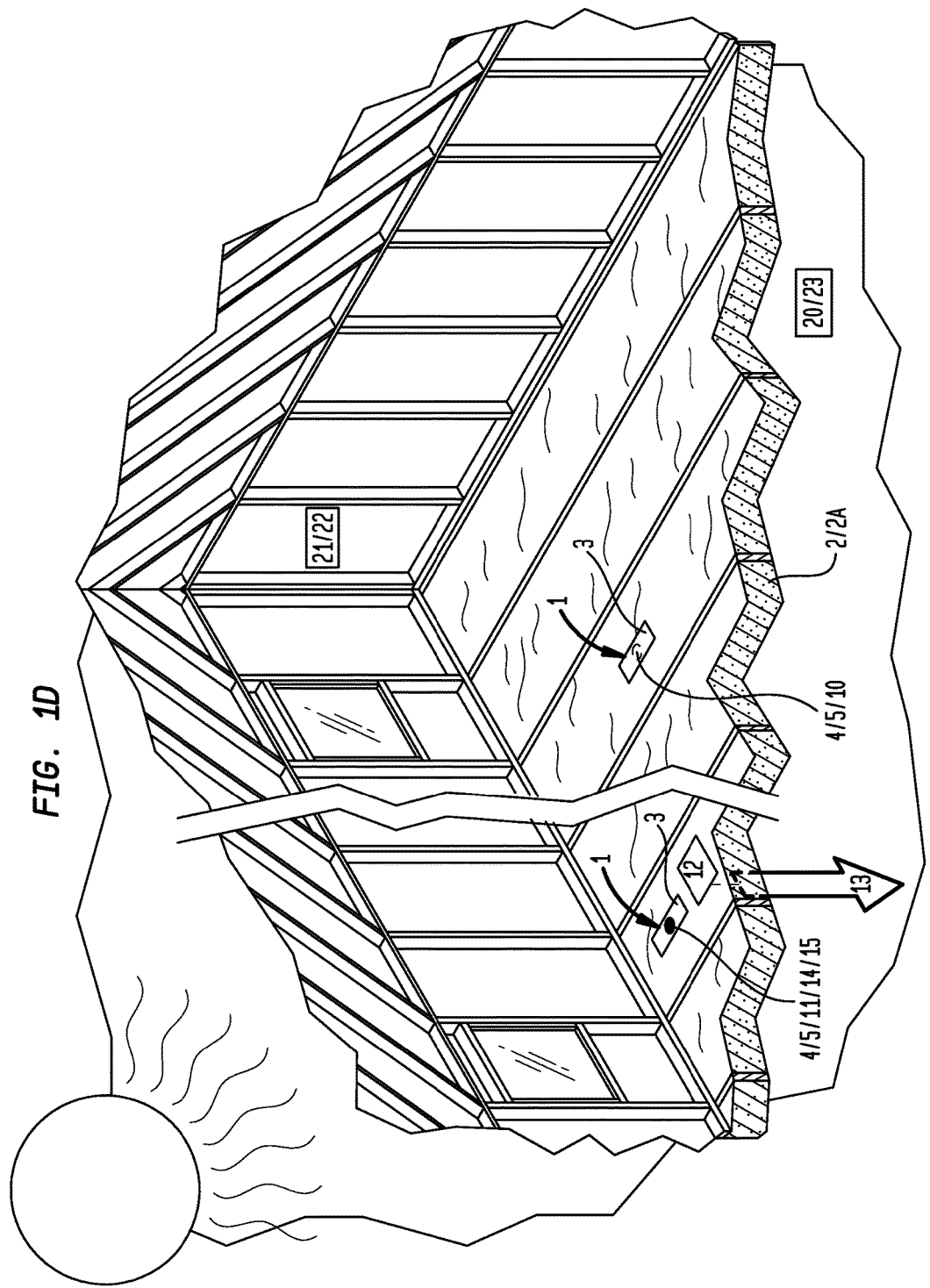
FIG. 1D is an illustration of a method of using a particular embodiment of a thermochromic efficiency indicator disposed within a space having a temperature affected by the temperature affector, whereby the temperature affector functions to insulate a first space having a lesser temperature from a second space having a greater temperature.
Figure 1E:
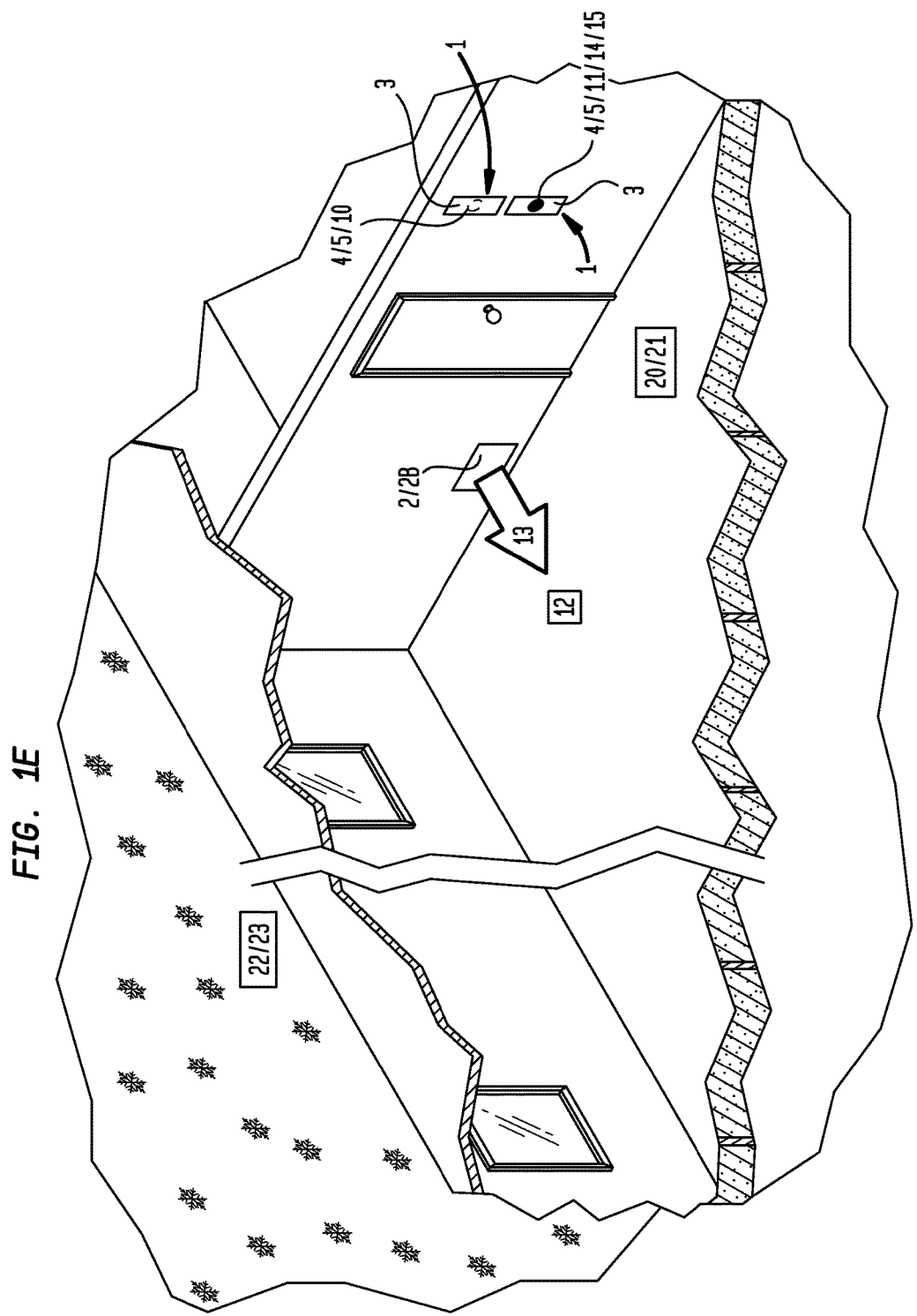
FIG. 1E is an illustration of a method of using a particular embodiment of a thermochromic efficiency indicator disposed within a space having a temperature affected by the temperature affector, whereby the temperature affector functions to provide a first space with a greater temperature than a second space having a lesser temperature.
Figure 1F:
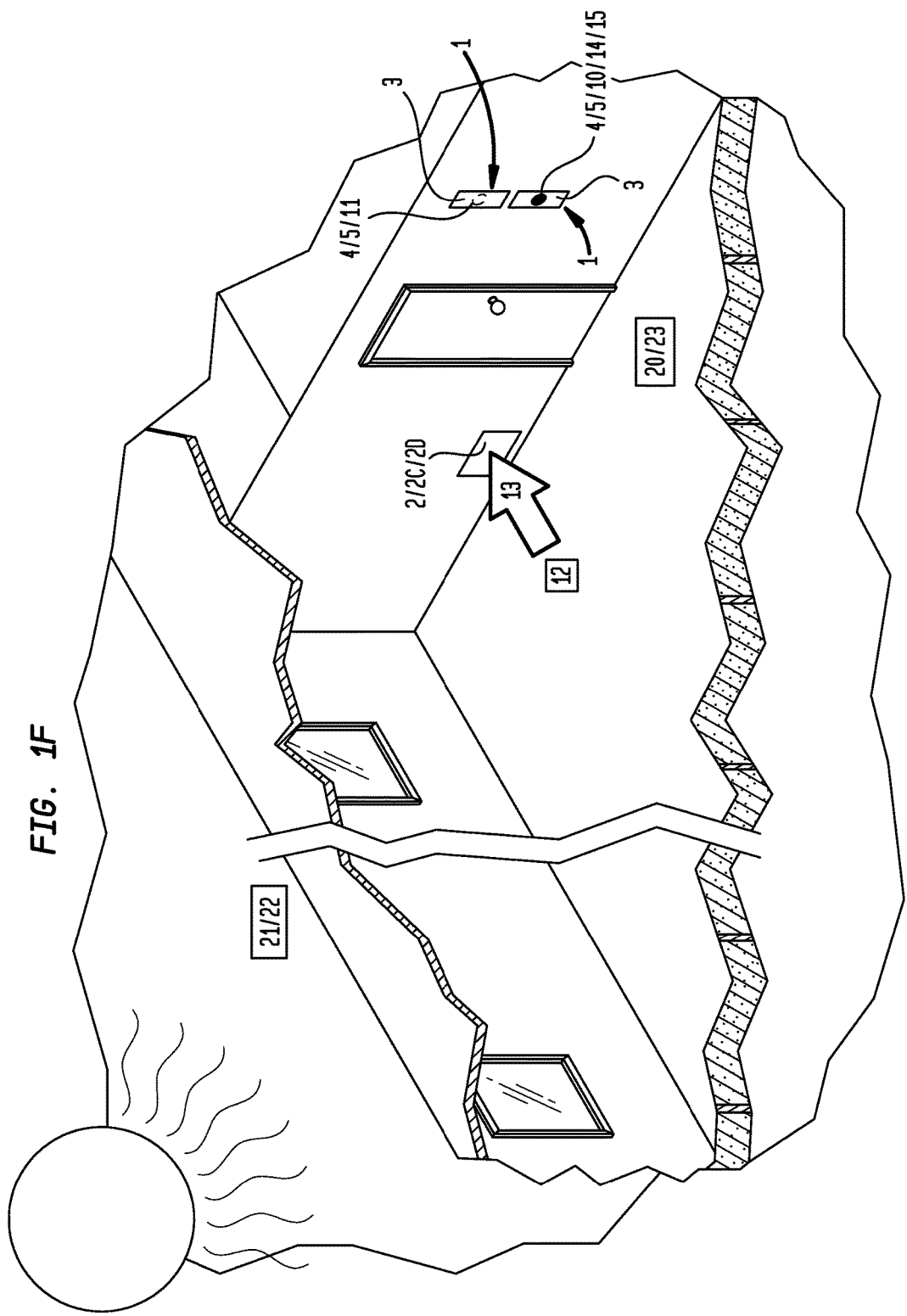
FIG. 1F is an illustration of a method of using a particular embodiment of a thermochromic efficiency indicator disposed within a space having a temperature affected by the temperature affector, whereby the temperature affector functions to provide a first space with a lesser temperature than a second space having a greater temperature.
Figure 2A:
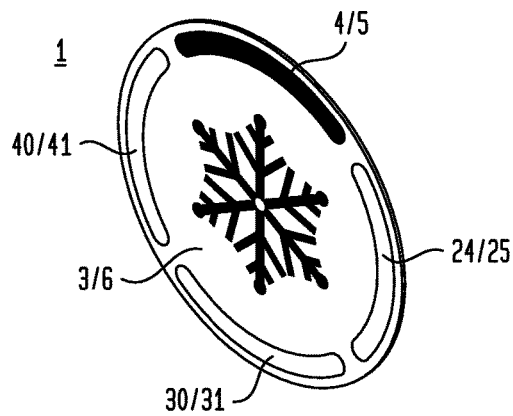
FIG. 2A is a perspective view of a particular embodiment of a thermochromic efficiency indicator.
Figure 2B:
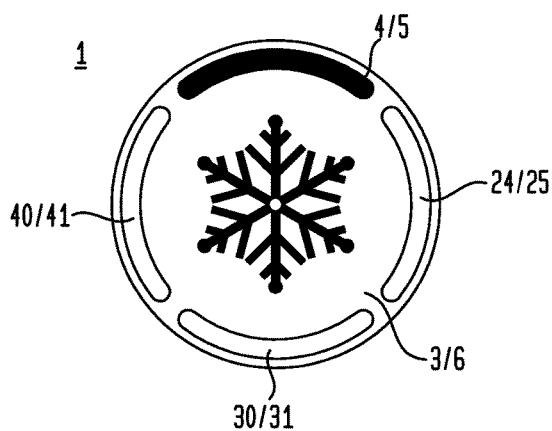
FIG. 2B is a front view of the particular embodiment of the thermochromic efficiency indicator shown in FIG. 2A.
Figure 2C:
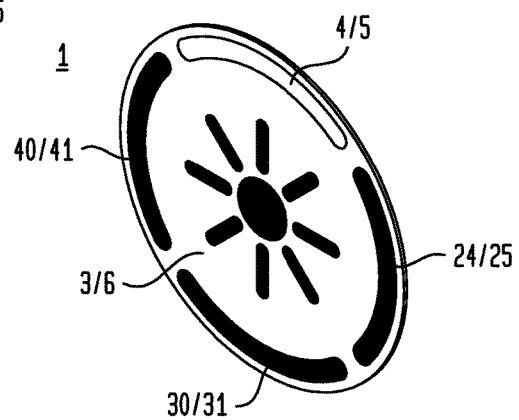
FIG. 2C is a perspective view of a particular embodiment of a thermochromic efficiency indicator.
Figure 2D:
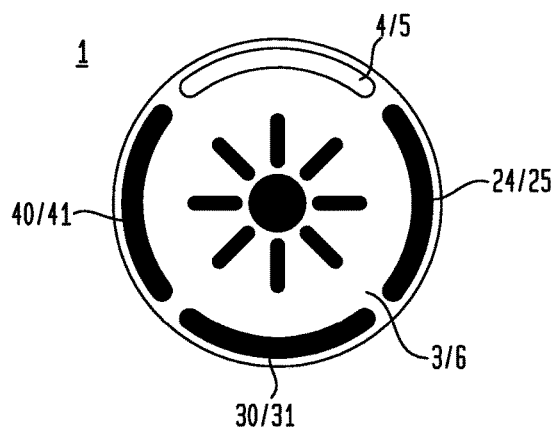
FIG. 2D is a front view of the particular embodiment of the thermochromic efficiency indicator shown in FIG. 2C.

Now referring primarily to FIG. 1E through FIG. 1F, as to particular embodiments, the temperature affector (2) can comprise a heater (2B) (as shown in the example of FIG. 1E); a cooler (2C), such as an air conditioner (2D) (as shown in the example of FIG. 1F); a ventilator; a circulator; or the like, or combinations thereof. Correspondingly, the thermochromic efficiency indicator (1) can be used to indicate efficiency of the heater (2B), the cooler (2C), the ventilator, the circulator, or the like, or combinations thereof, whereby the thermochromic efficiency indicator (1) includes a substrate (3) and a first indicia (4) coupled to the substrate (3), as described above. Thus, the first thermochromic compound color change indicates the heater (2B), the cooler (2C), the ventilator, the circulator, or the like, or combinations thereof, is below a first predetermined efficiency threshold.

Now referring primarily to FIG. 2A through FIG. 8, the substrate (3), which can include opposing substrate first and second faces (6)(7), can be formed from any of a numerous and wide variety of materials capable of supporting the first indicia (4), including as non-limiting examples: paper, paper-like materials, plastic, plastic-like materials, wood, wood-like materials, metal, metal-like materials, or the like, or combinations thereof.

Again referring primarily to FIG. 2A through FIG. 8, the substrate first face (6) can support the first indicia (4) and the substrate second face (7) can be positionable within a space having a temperature which may be affected by the temperature affector (2).

As to particular embodiments, the substrate second face (7) can include an adherent layer (8) which facilitates adherence of the substrate second face (7) to a surface within the space. As non-limiting examples, the adherent layer (8) can include a removable adhesive (9) which facilitates removable adherence of the substrate second face (7) to the surface within the space such that following adherence, the substrate second face (7) can be relatively easily removed from the surface within the space with relatively little or no damage to the thermochromic efficiency indicator (1) or the surface within the space.

Now referring primarily to FIG. 3B and FIG. 9A through FIG. 11D, the first indicia (4) includes a first thermochromic compound (5) capable of undergoing a first thermochromic compound color change, whereby the first thermochromic compound color change is associated with or results from a first thermochromic compound state change from a first thermochromic compound first state (10) to a first thermochromic compound second state (11). The first thermochromic compound state change can be achieved upon exposure of the first thermochromic compound (5) to a first temperature (12) associated with transfer of a first threshold amount of thermal energy (13), the transfer facilitated at least in part by the temperature affector (2), whereby transfer of the first threshold amount of thermal energy (13) indicates the temperature affector (2) is below the first predetermined efficiency threshold.

Now referring primarily to FIG. 1A, FIG. 1D, FIG. 1E, FIG. 9A, and FIG. 9B, as to particular embodiments, the first thermochromic compound (5) in the first thermochromic compound first state (10) can be substantially colorless, and the first thermochromic compound (5) in the first thermochromic compound second state (11) can exhibit a first thermochromic compound color (14). Accordingly, exhibition of the first thermochromic compound color (14) indicates the temperature affector (2) is below the first predetermined efficiency threshold.

Now referring primarily to FIG. 1A, FIG. 1D, FIG. 1E, and FIG. 9A, as to particular embodiments, the first indicia (4) can be substantially colorless when the first thermochromic compound (5) in the first thermochromic compound first state (10) is substantially colorless, and the first indicia (4) can exhibit a first indicia color (15) when the first thermochromic compound (5) in the first thermochromic compound second state (11) exhibits the first thermochromic compound color (14). Accordingly, exhibition of the first indicia color (15) indicates the temperature affector (2) is below the first predetermined efficiency threshold.

As an illustrative example, when the first thermochromic compound (5) is in the first thermochromic compound second state (11), the first thermochromic compound (5) can exhibit a first thermochromic compound color (14) of blue (although the invention is not limited to only blue and can include any of a numerous and wide variety of colors), in contrast to the first thermochromic compound (5) in the first thermochromic compound first state (10) which can be substantially colorless. As a result, when the first thermochromic compound (5) is in the first thermochromic compound second state (11), the first indicia (4) can exhibit a first indicia color (15) of blue to indicate the temperature affector (2) is below the first predetermined efficiency threshold.

Now referring primarily to FIG. 9B, as to other particular embodiments, the first indicia (4) can further include a colorant (16) having a colorant color (17) which differs from the first thermochromic compound color (14) exhibited by the first thermochromic compound (5) in the first thermochromic compound second state (11). The colorant (16) can be selected from the group including or consisting of: a pigment, a dye, a thermochromic composition, a photochromic composition, or the like, or combinations thereof.

The first indicia (4) can exhibit a first indicia first color (18) which includes a combination of a substantially colorless first thermochromic compound (5) and the colorant color (17) when the first thermochromic compound (5) is in the first thermochromic compound first state (10). The first indicia (4) can exhibit a first indicia second color (19) which includes a combination of the first thermochromic compound color (14) and the colorant color (17) when the first thermochromic compound (5) is in the first thermochromic compound second state (11). Accordingly, exhibition of the first indicia second color (19) indicates the temperature affector (2) is below the first predetermined efficiency threshold.

As an illustrative example, the first indicia (4) can include a colorant (16) having a colorant color (17) of blue (although the invention is not limited to only blue and can include any of a numerous and wide variety of colors) and a first thermochromic compound (5) which exhibits a first thermochromic compound color (14) of red (although the invention is not limited to only red and can include any of a numerous and wide variety of colors) when the first thermochromic compound (5) is in the first thermochromic compound second state (11). Correspondingly, the first indicia first color (18) can be blue when the first thermochromic compound (5) is substantially colorless in the first thermochromic compound first state (10). Further, the first indicia second color (19) can be purple, formed by combining the colorant color (17) of blue and the first thermochromic compound color (14) of red, when the first thermochromic compound (5) is in the first thermochromic compound second state (11). Accordingly, a first indicia second color (19) of purple indicates the temperature affector (2) is below the first predetermined efficiency threshold.

Now referring primarily to FIG. 1A, as to particular embodiments whereby the first thermochromic compound (5) in the first thermochromic compound first state (10) can be substantially colorless and the first thermochromic compound (5) in the first thermochromic compound second state (11) exhibits a first thermochromic compound color (14) and whereby exhibition of the first thermochromic compound color (14) indicates the temperature affector (2) is below the first predetermined efficiency threshold, the thermochromic efficiency indicator (1) may be useful for indicating efficiency of a temperature affector (2), such as an insulator (2A), intended to insulate a first space (20) having a greater temperature (21) from a second space (22) having a lesser temperature (23). For example, when the thermochromic efficiency indicator (1) is disposed within the first space (20), exhibition of the first thermochromic compound color (14) indicates the temperature affector (2) is below the first predetermined efficiency threshold.

Now referring primarily to FIG. 1D, as to particular embodiments whereby the first thermochromic compound (5) in the first thermochromic compound first state (10) can be substantially colorless and the first thermochromic compound (5) in the first thermochromic compound second state (11) exhibits a first thermochromic compound color (14) and whereby exhibition of the first thermochromic compound color (14) indicates the temperature affector (2) is below the first predetermined efficiency threshold, the thermochromic efficiency indicator (1) may be useful for indicating efficiency of a temperature affector (2), such an insulator (2B), intended to insulate a first space (20) having a lesser temperature (23) from a second space (22) having a greater temperature (21). For example, when the thermochromic efficiency indicator (1) is disposed within the second space (22), exhibition of the first thermochromic compound color (14) indicates the temperature affector (2) is below the first predetermined efficiency threshold.

Now referring primarily to FIG. 1E, as to particular embodiments whereby the first thermochromic compound (5) in the first thermochromic compound first state (10) can be substantially colorless and the first thermochromic compound (5) in the first thermochromic compound second state (11) exhibits a first thermochromic compound color (14) and whereby exhibition of the first thermochromic compound color (14) indicates the temperature affector (2) is below the first predetermined efficiency threshold, the thermochromic efficiency indicator (1) may be useful for indicating efficiency of a temperature affector (2), such as a heater (2B), intended to heat a first space (20) such that the first space (20) has a greater temperature (21) than a second space (22) which has a lesser temperature (23). For example, when the thermochromic efficiency indicator (1) is disposed within the first space (20), exhibition of the first thermochromic compound color (14) indicates the temperature affector (2) is below the first predetermined efficiency threshold.

Now referring primarily to FIG. 1B, FIG. 1C, FIG. 1F, FIG. 9C, and FIG. 9D, as to particular embodiments, the first thermochromic compound (5) in the first thermochromic compound first state (10) can exhibit a first thermochromic compound color (14), and the first thermochromic compound (5) in the first thermochromic compound second state (11) can be substantially colorless. Accordingly, exhibition of a substantially colorless first thermochromic compound (5) indicates the temperature affector (2) is below the first predetermined efficiency threshold.

Now referring primarily to FIG. 1B, FIG. 1C, FIG. 1F, and FIG. 9C, as to particular embodiments, the first indicia (4) can exhibit a first indicia color (15) when the first thermochromic compound (5) in the first thermochromic compound first state (10) exhibits the first thermochromic compound color (14), and the first indicia (4) can be substantially colorless when the first thermochromic compound (5) in the first thermochromic compound second state (11) is substantially colorless. Accordingly, exhibition of a substantially colorless first indicia (4) indicates the temperature affector (2) is below the first predetermined efficiency threshold.

As an illustrative example, when the first thermochromic compound (5) is in the first thermochromic compound second state (11), the first thermochromic compound (5) can be substantially colorless, in contrast to the first thermochromic compound (5) in the first thermochromic compound first state (10) which can exhibit a first thermochromic compound color (14) of blue (although the invention is not limited to only blue and can include any of a numerous and wide variety of colors). As a result, when the first thermochromic compound (5) is in the first thermochromic compound second state (11), the first indicia (4) can be substantially colorless, indicating the temperature affector (2) is below the first predetermined efficiency threshold.

Now referring primarily to FIG. 9D, as to other particular embodiments, the first indicia (4) can further include a colorant (16) having a colorant color (17) which differs from the first thermochromic compound color (14) exhibited by the first thermochromic compound (5) in the first thermochromic compound first state (10). The colorant (16) can be selected from the group including or consisting of: a pigment, a dye, a thermochromic composition, a photochromic composition or the like, or combinations thereof.

The first indicia (4) can exhibit a first indicia first color (18) which includes a combination of the first thermochromic compound color (14) and the colorant color (17) when the first thermochromic compound (5) is in the first thermochromic compound first state (10). The first indicia (4) can exhibit a first indicia second color (19) which includes a combination of the substantially colorless first thermochromic compound (5) and the colorant color (17) when the first thermochromic compound (5) is in the first thermochromic compound second state (11). Accordingly, exhibition of the first indicia second color (19) indicates the temperature affector (2) is below the first predetermined efficiency threshold.

As an illustrative example, the first indicia (4) can include a colorant (16) having a colorant color (17) of blue (although the invention is not limited to only blue and can include any of a numerous and wide variety of colors) and a first thermochromic compound (5) which exhibits a first thermochromic compound color (14) of red (although the invention is not limited to only red and can include any of a numerous and wide variety of colors) when the first thermochromic compound (5) is in the first thermochromic compound first state (10). Correspondingly, the first indicia first color (18) can be purple, formed by combining the colorant color (17) of blue and the first thermochromic compound color (14) of red, when the first thermochromic compound (5) is in the first thermochromic compound first state (10). Further, the first indicia second color (19) can be blue when the first thermochromic compound (5) is substantially colorless in the first thermochromic compound second state (11). Accordingly, a first indicia second color (19) of blue indicates the temperature affector (2) is below the first predetermined efficiency threshold.

Now referring primarily to FIG. 1B, as to particular embodiments whereby the first thermochromic compound (5) in the first thermochromic compound first state (10) exhibits a first thermochromic compound color (14) and the first thermochromic compound (5) in the first thermochromic compound second state (11) can be substantially colorless and whereby exhibition of a substantially colorless first thermochromic compound (5) indicates the temperature affector (2) is below the first predetermined efficiency threshold, the thermochromic efficiency indicator (1) may be useful for indicating efficiency of a temperature affector (2), such as an insulator (2A), intended to insulate a first space (20) having a lesser temperature (23) from a second space (22) having a greater temperature (21). For example, when the thermochromic efficiency indicator (1) is disposed within the first space (20), exhibition of the substantially colorless first thermochromic compound (5) indicates the temperature affector (2) is below the first predetermined efficiency threshold.

Now referring primarily to FIG. 1C, as to particular embodiments whereby the first thermochromic compound (5) in the first thermochromic compound first state (10) exhibits a first thermochromic compound color (14) and the first thermochromic compound (5) in the first thermochromic compound second state (11) can be substantially colorless and whereby exhibition of a substantially colorless first thermochromic compound (5) indicates the temperature affector (2) is below the first predetermined efficiency threshold, the thermochromic efficiency indicator (1) may be useful for indicating efficiency of a temperature affector (2), such as an insulator (2A), intended to insulate a first space (20) having a greater temperature (21) from a second space (22) having a lesser temperature (23). For example, when the thermochromic efficiency indicator (1) is disposed within the second space (22), exhibition of the substantially colorless first thermochromic compound (5) indicates the temperature affector (2) is below the first predetermined efficiency threshold.

Now referring primarily to FIG. 1F, as to particular embodiments whereby the first thermochromic compound (5) in the first thermochromic compound first state (10) exhibits a first thermochromic compound color (14) and the first thermochromic compound (5) in the first thermochromic compound second state (11) can be substantially colorless and whereby exhibition of a substantially colorless first thermochromic compound (5) indicates the temperature affector (2) is below the first predetermined efficiency threshold, the thermochromic efficiency indicator (1) may be useful for indicating efficiency of a temperature affector (2), such as a cooler (2C) (for example, an air conditioner (2D)), intended to cool a first space (20) such that the first space (20) has a lesser temperature (23) than a second space (22) which has a greater temperature (21). For example, when the thermochromic efficiency indicator (1) is disposed within the first space (20), exhibition of the substantially colorless first thermochromic compound (5) indicates the temperature affector (2) is below the first predetermined efficiency threshold.

The first thermochromic compound (5) is formulated to undergo the first thermochromic compound state change upon exposure of the first thermochromic compound (5) to a first temperature (12) which is associated with transfer of a first threshold amount of thermal energy (13), the transfer facilitated at least in part by the temperature affector (2), whereby transfer of the first threshold amount of thermal energy (13) indicates the temperature affector (2) is below the first predetermined efficiency threshold.

As an illustrative example, the first temperature (12) can be about 16° Celsius (about 61 Fahrenheit). Accordingly, transfer of an amount of thermal energy which is lesser than the first threshold amount of thermal energy (13) is associated with a temperature which is lesser than about 16° Celsius. Upon exposure to the temperature which is lesser than about 16° Celsius, the first thermochromic compound (5) is in the first thermochromic compound first state (10), indicating that the temperature affector (2) is at least at or above the first predetermined efficiency threshold. Correspondingly, transfer of an amount of thermal energy which is equal to or greater than the first threshold amount of thermal energy (13) is associated with a temperature which is equal to or greater than about 16° Celsius. Upon exposure to the temperature which is at least about 16° Celsius, the first thermochromic compound (5) achieves the first thermochromic compound second state (11), undergoing the first thermochromic compound color change to indicate the temperature affector (2) is below the first predetermined efficiency threshold.

The first temperature (12) can be any temperature which is associated with transfer of any desired first threshold amount of thermal energy (13), the transfer facilitated at least in part by the temperature affector (2), whereby transfer of the first threshold amount of thermal energy (13) indicates the temperature affector (2) is below the first predetermined efficiency threshold.

As to particular embodiments, when the temperature affector (2) comprises an insulator (2A), the first predetermined efficiency threshold can be associated with transfer of a first threshold amount of thermal energy (13) which corresponds to an R-value of the insulator (2A). The R-value is a measure of thermal resistance as indicated by formula I as follows:

$$R = \frac{\Delta T}{\dot{Q}_A} \quad \text{I}$$

whereby R is the R-value, $\Delta T$ is the temperature difference across the insulator (2A), and $\dot{Q}_A$ is the heat flux or heat transfer per unit area per time. Correspondingly, an insulator (2A) having a greater R-value is more efficient than an insulator (2A) having a lesser R-value.

Now referring primarily to FIG. 10A through FIG. 11D, the thermochromic efficiency indicator (1) can, but need not necessarily, further include a second indicia (24) coupled to the substrate (3), the second indicia (24) including a second thermochromic compound (25) capable of undergoing a second thermochromic compound color change, whereby the second thermochromic compound color change indicates the temperature affector (2) is below a second predetermined efficiency threshold.

The second thermochromic compound color change is associated with or results from a second thermochromic compound state change from a second thermochromic compound first state (26) to a second thermochromic compound second state (27). The second thermochromic compound state change is achieved upon exposure of the second thermochromic compound (25) to a second temperature (28) associated with transfer of a second threshold amount of thermal energy (29), the transfer facilitated at least in part by the temperature affector (2), whereby transfer of the second threshold amount of thermal energy (29) indicates the temperature affector (2) is below the second predetermined efficiency threshold.

Again referring primarily to FIG. 10A through FIG. 11D, the thermochromic efficiency indicator (1) can, but need not necessarily, further include a third indicia (30) coupled to the substrate (3), the third indicia (30) including a third thermochromic compound (31) capable of undergoing a third thermochromic compound color change, whereby the third thermochromic compound color change indicates the temperature affector (2) is below a third predetermined efficiency threshold.

The third thermochromic compound color change is associated with or results from a third thermochromic compound state change from a third thermochromic compound first state (32) to a third thermochromic compound second state (33). The third thermochromic compound state change is achieved upon exposure of the third thermochromic compound (31) to a third temperature (34) associated with transfer of a third threshold amount of thermal energy (35), the transfer facilitated at least in part by the temperature affector (2), whereby transfer of the third threshold amount of thermal energy (35) indicates the temperature affector (2) is below the third predetermined efficiency threshold.

Now referring primarily to FIG. 10A through FIG. 10D, as to particular embodiments, the second or third thermochromic compound (25)(31) in the respective second or third thermochromic compound first state (26)(32) can be substantially colorless, as described above for the first thermochromic compound (5). Further, the second or third indicia (24)(30) can be correspondingly substantially colorless when the respective second or third thermochromic compound (25)(31) in the respective second or third thermochromic compound first state (26)(32) is substantially colorless, as described above for the first thermochromic compound (5).

Additionally, again referring primarily to FIG. 10A through FIG. 10D, the second or third thermochromic compound (25)(31) in the respective second or third thermochromic compound second state (27)(33) can exhibit a respective second or third thermochromic compound color (36)(37), as described above for the first thermochromic compound (5). Further, the second or third indicia (24)(30) can correspondingly exhibit a second or third indicia color (38)(39) when the respective second or third thermochromic compound (25)(31) in the respective second or third thermochromic compound second state (27)(33) exhibits the respective second or third thermochromic compound color (36)(37), as described above for the first thermochromic compound (5). Accordingly, exhibition of the second or third indicia color (38)(39) indicates the temperature affector (2) is below the respective second or third predetermined efficiency threshold.

As to particular embodiments, the second or third indicia (24)(30) can further include a colorant (16) having a colorant color (17) which differs from the respective second or third thermochromic compound color (36)(37) exhibited by the respective second or third thermochromic compound (25)(31) in the respective second or third thermochromic compound second state (27)(33), as described above for the first indicia (4). Accordingly, a color change from a second or third indicia first color to a respective second or third indicia second color indicates the temperature affector (2) is below the respective second or third predetermined efficiency threshold (not shown).

Now referring primarily to FIG. 11A through FIG. 11D, as to other particular embodiments, the second or third thermochromic compound (25)(31) in the respective second or third thermochromic compound first state (26)(32) can exhibit a respective second or third thermochromic compound color (36)(37), as described above for the first thermochromic compound (5). Further, the second or third indicia (24)(30) can correspondingly exhibit a second or third indicia color (38)(39) when the respective second or third thermochromic compound (25)(31) in the respective second or third thermochromic compound first state (26)(32) exhibits a respective second or third thermochromic compound color (36)(37), as described above for the first thermochromic compound (5).

Additionally, again referring primarily to FIG. 11A through FIG. 11D, the second or third thermochromic compound (25)(31) in the respective second or third thermochromic compound second state (27)(33) can be substantially colorless, as described above for the first thermochromic compound (5). Further, the second or third indicia (24)(30) can be correspondingly substantially colorless when the respective second or third thermochromic compound (25)(31) in the respective second or third thermochromic compound second state (27)(33) is substantially colorless, as described above for the first thermochromic compound (5). Accordingly, exhibition a substantially colorless second or third indicia (24)(30) indicates the temperature affector (2) is below the respective second or third predetermined efficiency threshold.

As to particular embodiments, the second or third indicia (24)(30) can further include a colorant (16) having a colorant color (17) which differs from the respective second or third thermochromic compound color (36)(37) exhibited by the respective second or third thermochromic compound (25)(31) in the respective second or third thermochromic compound first state (26)(32), as described above for the first indicia (4). Accordingly, a color change from a second or third indicia first color to a respective second or third indicia second color indicates the temperature affector (2) is below the respective second or third predetermined efficiency threshold (not shown).

The thermochromic efficiency indicator (1) can, but need not necessarily, further include one or more additional indicia (40) coupled to the substrate (3) (as shown in the example of FIG. 2A through FIG. 2D), the one or more additional indicia (40) each including a corresponding additional thermochromic compound (41) capable of undergoing a thermochromic compound color change, whereby the thermochromic compound color change indicates the temperature affector (2) is below an additional predetermined efficiency threshold.

Now referring primarily to FIG. 10A through FIG. 11D, as to particular embodiments, the first, second, and third indicia (4)(24)(30) can be configured as discrete first, second, and third indicia (4)(24)(30), which can be coupled to the substrate (3) in any of a numerous and wide variety of configurations.

As an illustrative example, the discrete first, second, and third indicia (4)(24)(30) can be linearly disposed on the substrate (3), whereby the leftmost or uppermost indicia corresponds to the highest temperature associated with transfer of the greatest threshold amount of thermal energy and the rightmost or lowermost indicia corresponds to the lowest temperature associated with transfer of the least threshold amount of thermal energy.

As another illustrative example, the discrete first, second, and third indicia (4)(24)(30) can be linearly disposed on the substrate (3), whereby the leftmost or uppermost indicia corresponds to the lowest temperature associated with transfer of the least threshold amount of thermal energy and the rightmost or lowermost indicia corresponds to the highest temperature associated with transfer of the greatest threshold amount of thermal energy.

As yet another illustrative example, the discrete first, second, and third indicia (4)(24)(30) can be disposed about the periphery of the substrate (3) (as shown in the example of FIG. 2A through FIG. 2D).

Now referring primarily to FIG. 12, as to other particular embodiments, the first, second, and third indicia (4)(24)(30) can be combined into one continuous indicia (44), which can be coupled to the substrate (3) in any of a numerous and wide variety of configurations. As an illustrative example, the continuous indicia (44) can be configured as a bar-like indicia (45) which can be disposed substantially horizontally on the substrate (3) (as shown in the example of FIG. 12) or substantially vertically on the substrate (3) (not shown).

Now referring primarily to FIG. 13A and FIG. 13B, as to particular embodiments, the thermochromic efficiency indicator (1) can be configured to include more than one indicator. As an illustrative example, the thermochromic efficiency indicator (1) can include a first thermochromic efficiency indicator (46) which functions to indicate a cooling efficiency and a second thermochromic efficiency indicator (47) which functions to indicate a heating efficiency.

As shown in the example of FIG. 13A, as to particular embodiments whereby the thermochromic efficiency indicator (1) includes more than one indicator, each of the first, second, and third indicia (4)(24)(30) within each of the first and second thermochromic efficiency indicators (46)(47) can be configured as discrete first, second, and third indicia (4)(24)(30), which can be coupled to the substrate (3) in any of a numerous and wide variety of configurations.

As shown in the example of FIG. 13B, as to particular embodiments whereby the thermochromic efficiency indicator (1) includes more than one indicator, each of the first, second, and third indicia (4)(24)(30) within each of the first and second thermochromic efficiency indicators (46)(47) can be combined into one continuous indicia (44), which can be coupled to the substrate (3) in any of a numerous and wide variety of configurations.

As to particular embodiments, the thermochromic efficiency indicator (1) can include indicia (4)(24)(30) comprising a thermochromic compound thermochromic compound (5)(25)(31) which can be printed directly onto the substrate (3).

As to particular embodiments, the substrate (3) can be discrete from the temperature affector (2).

As to other particular embodiments, the substrate (3) can be a surface of the temperature affector (2), whereby the indicia (4)(24)(30) can be printed directly onto the surface of the temperature affector (2). As an illustrative example, the temperature affector (2) can be configured as an insulator (2A), such as insulation, whereby the indicia (4)(24)(30) can be printed directly onto the surface of the insulation.

As to other particular embodiments, the indicia (4)(24)(30) can be embedded within the temperature affector (2). As an illustrative example, the temperature affector (2) can be configured as an insulator (2A), such as insulation, whereby the indicia (4)(24)(30) can be embedded within the insulation. As a non-limiting example, the indicia (4)(24)(30) can be combined with the blown-in insulation when the insulation is blown into the desired space.

The thermochromic compound (5)(25)(31) can be any compound which undergoes a color change in response to a temperature change. As to particular embodiments, the thermochromic compound (5)(25)(31) can be a liquid crystal. As to other particular embodiments, the thermochromic compound (5)(25)(31) can be a metallo-organic complex crystal. As to yet other particular embodiments, the thermochromic compound (5)(25)(31) can be included in a thermochromic system, whereby the thermochromic system includes the thermochromic compound (5)(25)(31), a developer, and a solvent.

As to particular embodiments, the thermochromic system can include a thermochromic compound formulated as a leuco dye. As non-limiting examples, leuco dyes which may be useful in particular embodiments of the thermochromic efficiency indicator (1) can include: spirolactones; fluorans; spiropyrans; fulgides; diphenylmethane phthalide derivatives; phenylindolylphthalide derivatives; indolylphthalide derivatives; diphenylmethane azaphthalide derivatives; phenylindolylazaphthalide derivatives; fluoran derivatives; styrynoquinoline derivatives; diaza-rhodamine lactone derivatives; 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino) fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran, 1,2-benzo-6-(N-ethyl-N-isoamylamino)fluoran; 2-(3-methoxy-4-dodecoxystyryl) quinoline; spiro[5H-(1)benzopyrano(2,3-d)pyrimidine-5,1'(3'H)isobenzofuran]-3'-one; 2-(diethylamino)-8-(diethylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-methyl-spiro[5H-(1) benzopyrano(2,3-d)pyrimidine-5,1'(3'H)isobenzofuran]-3'-one; 2-(di-n-butylamino)-8-(diethylamino)-4-methyl-spiro [5H-(1)benzopyrano(2,3-d)pyrimidine-5,1'(3'H) isobenzofuran]-3'-one; 2-(di-n-butylamino)-8(N-ethyl-N-isoamylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-phenyl; quinazolines; bis-quinazolines; trisubstituted pyridines; 2,4,6-trisubstituted pyridines; or the like; or combinations thereof.

As to particular embodiments, the thermochromic system can include a developer formulated as a proton donor, such as an acid. As non-limiting examples, developers which may be useful in particular embodiments of the thermochromic efficiency indicator (1) can include: bisphenol A; bisphenol F; tetrabromobisphenol A; 1'-methylenedi-2-naphthol; 1,1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl) cyclohexane; 1,3-bis[2-(4-hydroxyphenyl)-2-propyl] benzene; 1-naphthol; 2-naphthol; 2,2 bis(2-hydroxy-5-biphenylyl)propane; 2,2-bis(3-cyclohexyl-4-hydroxy) propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene)diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis(4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris (4-hydroxyphenyl)ethane; 1,1-bis(3-cyclohexyl-4-hydroxyphenyl)cyclohexane; 1,1-bis(4-hydroxy-3-methylphenyl) cyclohexane; 1,1-bis(4-hydroxyphenyl)cyclohexane; 1,3-bis [2-(4-hydroxyphenyl)-2-propyl]benzene; 1-naphthol 2,2'-biphenol; 2,2-bis(2-hydroxy-5-biphenylyl)propane; 2,2-bis (3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl) phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl)sulfidem; bis(4-hydroxyphenyl)sulfone methyl 4-hydroxybenzoate; resorcinol; tetrabromobisphenol A; derivative salts of salicylic acid; 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; 4,4'-di-halo-2,2'-biphenol, wherein the halo is chloro, fluoro, bromo, or iodo; or the like; or combinations thereof.

The thermochromic system can further include a solvent. As to particular embodiments, one or more solvents can function to control, at least in part, the thermochromic compound color change by influencing the reaction between the thermochromic compound (5)(25)(31) and the developer. As non-limiting examples, solvents which may be useful in particular embodiments of the thermochromic efficiency indicator (1) can include: aldehydes; thiols; sulfides; ethers; ketones; esters, such as fatty esters; alcohols, such as fatty alcohols; acid amides, such as fatty amines; or the like; or combinations thereof.

As non-limiting examples, sulfides which may be useful in particular embodiments of the thermochromic efficiency indicator (1) can include: di-n-octyl sulfide; di-n-nonyl sulfide; di-n-decyl sulfide; di-n-dodecyl sulfide; di-n-tetradecyl sulfide; di-n-hexadecyl sulfide; di-n-octadecyl sulfide; octyl dodecyl sulfide; diphenyl sulfide; dibenzyl sulfide; ditolyl sulfide; diethylphenyl sulfide; dinaphthyl sulfide; 4,4'-dichlorodiphenyl sulfide; 2,4,5,4'tetrachlorodiphenyl sulfide; or the like; or combinations thereof.

As non-limiting examples, ethers which may be useful in particular embodiments of the thermochromic efficiency indicator (1) can include: aliphatic ethers having 10 or more carbon atoms; dipentyl ether; dihexyl ether; diheptyl ether; dioctyl ether; dinonyl ether; didecyl ether; diundecyl ether; didodecyl ether; ditridecyl ether; ditetradecyl ether; dipentadecyl ether; dihexadecyl ether; dioctadecyl ether; decanediol dimethyl ether; undecanediol dimethyl ether; dodecanediol dimethyl ether; tridecanediol dimethyl ether; decanediol diethyl ether; undecanediol diethyl ether; alicyclic ethers; s-trioxane; aromatic ethers; phenylether; benzyl phenyl ether; dibenzyl ether; di-p-tolyl ether; 1-methoxynaphthalene; 3,4,5trimethoxytoluene; or the like; or combinations thereof.

As non-limiting examples, ketones which may be useful in particular embodiments of the thermochromic efficiency indicator (1) can include: aliphatic ketones having 10 or more carbon atoms; 2-decanone; 3-decanone; 4-decanone; 2-undecanone; 3-undecanone; 4-undecanone; 5-undecanone; 6-undecanone; 2-dodecanone; 3-dodecanone; 4-dodecanone; 5-dodecanone; 2-tridecanone; 3-tridecanone; 2-tetradecanone; 2-pentadecanone; 8-pentadecanone; 2-hexadecanone; 3-hexadecanone; 9-heptadecanone; 2-pentadecanone; 2-octadecanone; 2-nonadecanone; 10-nonadecanone; 2-eicosanone; 11-eicosanone; 2-heneicosanone; 2-docosanone; laurone; stearone; aryl alkyl ketones having 12 to 24 carbon atoms; n-octadecanophenone; n-heptadecanophenone; n-hexadecanophenone; n-pentadecanophenone; n-tetradecanophenone; 4-n-dodecaacetophenone; n-tridecanophenone; 4-n-undecanoacetophenone; n-laurophenone; 4-n-decanoacetophenone; n-undecanophenone; 4-n-nonylacetophenone; n-decanophenone; 4-n-octylacetophenone; n-nonanophenone; 4-n-heptylacetophenone; n-octanophenone; 4-n-hexylacetophenone; 4-n-cyclohexylacetophenone; 4-tert-butylpropiophenone; n-heptaphenone; 4-n-pentylacetophenone; cyclohexyl phenyl ketone; benzyl n-butyl ketone; 4-n-butylacetophenone; n-hexanophenone; 4-isobutylacetophenone; 1-acetonaphthone; 2-acetonaphthone; cyclopentyl phenyl ketone; aryl aryl ketones; benzophenone; benzyl phenyl ketone; dibenzyl ketone; alicyclic ketones; cyclooctanone; cyclododecanone; cyclopentadecanone; 4-tert-butylcyclohexanone; ethyl caprylate; octyl caprylate; stearyl caprylate; myristyl caprate; stearyl caprate; docosyl caprate; 2-ethylhexyl laurate; n-decyl laurate; 3-methylbutyl myristate; cetyl myristate; isopropyl palmitate; neopentyl palmitate; nonyl palmitate; cyclohexyl palmitate; n-butyl stearate; 2-methylbutyl stearate; stearyl behenate 3,5,5-trimethylhexyl stearate; n-undecyl stearate; pentadecyl stearate; stearyl stearate; cyclohexylmethyl stearate; isopropyl behenate; hexyl behenate; lauryl behenate; behenyl behenate; cetyl benzoate; stearyl p-tert-butylbenzoate; dimyristyl phthalate; distearyl phthalate; dimyristyl oxalate; dicetyl oxalate; dicetyl malonate; dilauryl succinate; dilauryl glutarate; diundecyl adipate; dilauryl azelate; di-n-nonyl sebacate; 1,18-dineopentyloctadecylmethylenedicarboxylate; ethylene glycol dimyristate; propylene glycol dilaurate; propylene glycol distearate; hexylene glycol dipalmitate; 1,5-pentanediol dimyristate; 1,2,6-hexanetriol trimyristate; 1,4-cyclohexanediol didecanoate; 1,4-cyclohexanedimethanol dimyristate; xylene glycol dicaprate; xylene glycol distearate; or the like; or combinations thereof.

As non-limiting examples, esters which may be useful in particular embodiments of the thermochromic efficiency indicator (1) can include: esters of a saturated fatty acid with a branched aliphatic alcohol; esters of an unsaturated fatty acid or a saturated fatty acid having one or more branches or substituents with an aliphatic alcohol having one or more branches or 16 or more carbon atoms; cetyl butyrate; stearyl butyrate; behenyl butyrate; 2-ethylhexyl butyrate; 2-ethylhexyl behenate; 2-ethylhexyl myristate; 2-ethylhexyl caprate; 3,5,5-trimethylhexyl laurate; butyl palmitate; 3,5,5-trimethylhexyl palmitate; 3,5,5-trimethylhexyl stearate; 2-methylbutyl caproate; 2-methylbutyl caprylate; 2-methylbutyl caprate; 1-ethylpropyl palmitate; 1-ethylpropyl stearate; 1-ethylpropyl behenate; 1-ethylhexyl laurate; 1-ethylhexyl myristate; 1-ethylhexyl palmitate; 2-methylpentyl caproate; 2-methylpentyl caprylate; 2-methylpentyl caprate; 2-methylpentyl laurate; 2-methylbutyl stearate; 2-methylbutyl stearate; 3-methylbutyl stearate; 2-methylheptyl stearate; 2-methylbutyl behenate; 3-methylbutyl behenate; 1-methylheptyl stearate; 1-methylheptyl behenate; 1-ethylpentyl caproate; 1-ethylpentyl palmitate; 1-methylpropyl stearate; 1-methyloctyl stearate; 1-methylhexyl stearate; 1;1dimethylpropyl laurate; 1-methylpentyl caprate; 2-methylhexyl palmitate; 2-methylhexyl stearate; 2-methylhexyl behenate; 3;7-dimethyloctyl laurate; 3;7-dimethyloctyl myristate; 3;7-dimethyloctyl palmitate; 3;7-dimethyloctyl stearate; 3;7-dimethyloctyl behenate; stearyl oleate; behenyl oleate; stearyl linoleate; behenyl linoleate; 3;7-dimethyloctyl erucate; stearyl erucate; isostearyl erucate; cetyl isostearate; stearyl isostearate; 2-methylpentyl 12-hydroxystearate; 2-ethylhexyl 18-bromostearate; isostearyl 2-ketomyristate; 2-ethylhexyl-2-fluoromyristate; cetyl butyrate; stearyl butyrate; behenyl butyrate; or the like; or combinations thereof.

As non-limiting examples, alcohols which may be useful in particular embodiments of the thermochromic efficiency indicator (1) can include: monohydric aliphatic saturated alcohols; decyl alcohol; undecyl alcohol; dodecyl alcohol; tridecyl alcohol; tetradecyl alcohol; pentadecyl alcohol; hexadecyl alcohol; heptadecyl alcohol; octadecyl alcohol; eicosyl alcohol; behenyl alcohol; docosyl alcohol; aliphatic unsaturated alcohols; allyl alcohol; oleyl alcohol; alicyclic alcohols; cyclopentanol; cyclohexanol; cyclooctanol; cyclododecanol; 4-tert-butylcyclohexanol; aromatic alcohols; 4-methylbenzyl alcohol; benzhydrol; polyhydric alcohols; polyethylene glycol; or the like; or combinations thereof.

As non-limiting examples, acid amides which may be useful in particular embodiments of the thermochromic efficiency indicator (1) can include: acetamide; propionamide; butyramide; capronamide; caprylamide; capric amide; lauramide; myristamide; palmitamide; stearamide; behenamide; oleamide; erucamide; benzamide; capronanilide; caprylanilide; capric anilide; laruanilide; myristanilide; palmitanilide; stearanilide; behenanilide; oleanilide; erucanilide; N-methylcapronamide; N-methylcaprylamide; N-methyl (capric amide); N-methyllauramide; N-methylmyristamide; N-methylpalmitamide; N-methylstearamide; N-methylbehenamide; N-methyloleamide; N-methylerucamide; N-ethyllauramide; N-ethylmyristamide; N-ethylpalmitamide; N-ethylstearamide; N-ethyloleamide; N-butyllauramide; N-butylmyristamide; N-butylpalmitamide; N-butylstearamide; N-butyloleamide; N-octyllauramide; N-octylmyristamide; N-octylpalmitamide; N-octylstearamide; N-octyloleamide; N-dodecyllauramide; N-dodecylmyristamide; N-dodecylpalmitamide; N-dodecylstearamide; N-dodecyloleamide; dilauroylamine; dimyristoylamine; dipalmitoylamine; distearoylamine; dioleoylamine; trilauroylamine; trimyristoylamine; tripalmitoylamine; tristearoylamine; trioleoylamine; succinamide; adipamide; glutaramide; malonamide; azelamide; maleamide; N-methylsuccinamide; N-methyladip amide; N-methylglutaramide; N-methylmalonamide; N-methylazelamide; N-ethylsuccinamide; N-ethyladipamide; N-ethylglutaramide; N-ethylmalonamide; N-ethylazelamide; N-butylsuccinamide; N-butyladipamide; N-butylglutaramide; N-butylmalonamide; N-octyladipamide; N-dodecyladipamide; or the like; or combinations thereof.

The thermochromic system can, but need not necessarily, further include a modifier. As to particular embodiments, one or more modifiers can function to control, at least in part, the thermochromic compound color change by influencing the reaction between the thermochromic compound (5)(25)(31) and the developer. As non-limiting examples, modifiers which may be useful in particular embodiments of the thermochromic efficiency indicator (1) can include: ultra violet (UV) stabilizers; crystallinity modifiers; or the like; or combinations thereof.

The thermochromic system can, but need not necessarily, have a color-memory property whereby after the thermochromic compound (5)(25)(31) undergoes the thermochromic compound color change associated with the thermochromic compound state change from the thermochromic compound first state (10)(26)(32) to the thermochromic compound second state (11)(27)(33) upon exposure to the temperature (12)(28)(34) associated with transfer of the threshold amount of thermal energy (13)(29)(35), the transfer facilitated at least in part by the temperature affector (2), the thermochromic compound second state (11)(27)(33) is retained even upon discontinuation of exposure to the temperature (12)(28)(34). Correspondingly, the thermochromic efficiency indicator (1) can effectively record the exposure to the temperature (12)(28)(34) associated with transfer of the threshold amount of thermal energy (13)(29)(35), the transfer facilitated at least in part by the temperature affector (2), which is in contrast to a conventional thermometer, which only displays the current temperature and does not record temperatures the thermometer may have been exposed to prior to exposure to the current temperature.

As to particular embodiments, the thermochromic compound second state (11)(27)(33) is reversibly retained even upon discontinuation of exposure to the temperature (12)(28)(34).

Now referring primarily to FIG. 14A, hysteresis characteristics of a particular embodiment of a thermochromic system having the color-memory property can be described by illustrating the dependence of color density on temperature.

Again referring primarily to FIG. 14A, the y axis shows the color density and the x axis shows the temperature. The color density of the thermochromic system changes with temperature along the curve in the direction shown by the arrow marks. Point A indicates the color density at a maximum temperature $T_1$ for achieving the complete colored state (whereby $T_1$ is the complete coloring temperature). Point B indicates the color density at a maximum temperature $T_2$ for retention of the complete colored state (whereby $T_2$ is the maximum color-retaining temperature). Point C indicates the color density at a minimum temperature $T_3$ for achieving a complete decolored or colorless state (whereby $T_3$ is the complete decoloring temperature). Point D indicates the color density at a minimum temperature $T_4$ for retention of the complete decolored or colorless state (whereby $T_4$ is the minimum decolor-retaining temperature).

Again referring primarily to FIG. 14A, while both the complete colored state and the complete decolored or colorless state can exist between $T_2$ and $T_4$, the state retained is dependent upon the state previously achieved. For example, if the complete colored state was previously achieved upon exposure to $T_1$, the complete colored state will be retained until exposure to a temperature equal to or greater than $T_2$. Alternatively, if the complete decolored or colorless state was previously achieved upon exposure to $T_3$, the complete decolored or colorless state will be retained until exposure to a temperature equal to or lesser than $T_4$.

As to particular embodiments, the colored state or the decolored or colorless state can be retained upon exposure to temperatures between about 5 Celsius degrees to about 100 Celsius degrees (between about 5 Fahrenheit degrees to about 100 Fahrenheit degrees) from the temperature at which the colored state or the decolored or colorless state was achieved.

As to particular embodiments, the colored state or the decolored or colorless state can be retained upon exposure to temperatures selected from the group including or consisting of: between about 5 Celsius degrees to about 100 Celsius degrees from the temperature at which the colored state or the decolored or colorless state was achieved; between about 5 Celsius degrees to about 95 Celsius degrees from the temperature at which the colored state or the decolored or colorless state was achieved; between about 5 Celsius degrees to about 90 Celsius degrees from the temperature at which the colored state or the decolored or colorless state was achieved; between about 5 Celsius degrees to about 85 Celsius degrees from the temperature at which the colored state or the decolored or colorless state was achieved; between about 5 Celsius degrees to about 80 Celsius degrees from the temperature at which the colored state or the decolored or colorless state was achieved; between about 5 Celsius degrees to about 75 Celsius degrees from the temperature at which the colored state or the decolored or colorless state was achieved; between about 5 Celsius degrees to about 70 Celsius degrees from the temperature at which the colored state or the decolored or colorless state was achieved; between about 5 Celsius degrees to about 65 Celsius degrees from the temperature at which the colored state or the decolored or colorless state was achieved; between about 5 Celsius degrees to about 60 Celsius degrees from the temperature at which the colored state or the decolored or colorless state was achieved; between about 5 Celsius degrees to about 55 Celsius degrees from the temperature at which the colored state or the decolored or colorless state was achieved; between about 5 Celsius degrees to about 50 Celsius degrees from the temperature at which the colored state or the decolored or colorless state was achieved; between about 5 Celsius degrees to about 45 Celsius degrees from the temperature at which the colored state or the decolored or colorless state was achieved; between about 5 Celsius degrees to about 40 Celsius degrees from the temperature at which the colored state or the decolored or colorless state was achieved; between about 5 Celsius degrees to about 35 Celsius degrees from the temperature at which the colored state or the decolored or colorless state was achieved; between about 5 Celsius degrees to about 30 Celsius degrees from the temperature at which the colored state or the decolored or colorless state was achieved; between about 5 Celsius degrees to about 25 Celsius degrees from the temperature at which the colored state or the decolored or colorless state was achieved; between about 5 Celsius degrees to about 20 Celsius degrees from the temperature at which the colored state or the decolored or colorless state was achieved; between about 5 Celsius degrees to about 15 Celsius degrees from the temperature at which the colored state or the decolored or colorless state was achieved; and between about 5 Celsius degrees to about 10 Celsius degrees from the temperature at which the colored state or the decolored or colorless state was achieved.

As a first illustrative example in which the thermochromic compound (5)(25)(31) in a thermochromic compound first state (10)(26)(32) is substantially colorless and the thermochromic compound (5)(25)(31) in a thermochromic compound second state (11)(27)(33) exhibits a thermochromic compound color (14)(36)(37), whereby exhibition of the thermochromic compound color (14)(36)(37) indicates a temperature affector (2) is below a predetermined efficiency threshold, the thermochromic compound (5)(25)(31) can be in a decolored or colorless state until cooled to temperature $T_4$, achieving a completely colored state upon cooling to temperature $T_1$. Following, the completely colored state can be retained upon heating until temperature $T_2$ is reached.

As a second illustrative example in which the thermochromic compound (5)(25)(31) in a thermochromic compound first state (10)(26)(32) exhibits a thermochromic compound color (14)(36)(37) and the thermochromic compound (5)(25)(31) in a thermochromic compound second state (11)(27)(33) is substantially colorless, whereby exhibition of a substantially colorless thermochromic compound (5)(25)(31) indicates a temperature affector (2) is below a predetermined efficiency threshold, the thermochromic compound (5)(25)(31) can be in a colored state until heated to temperature $T_2$, achieving a completely decolored or colorless state upon heating to temperature $T_3$. Following, the completely decolored or colorless state can be retained upon cooling until temperature $T_4$ is reached.

As to particular embodiments, the thermochromic system can be encapsulated within microcapsules to provide a microencapsulated thermochromic system. As to particular embodiments, the microcapsules can be substantially spherical and have a diameter of less than about 3 micrometers. As to particular embodiments, the diameter can be selected from the group including or consisting of: less than about 3 micrometers; less than about 2.5 micrometers; less than about 2 micrometers; less than about 1.5 micrometers; and less than about 1 micrometer.

As to particular embodiments, the thermochromic system can be combined with an encapsulation resin and an aqueous mixture to form a slurry, which then includes the encapsulated thermochromic system. As a non-limiting example, the encapsulation resin can include CYMEL® 385 resin the aqueous mixture can include water and ethylene maleic acid in a range of between about 1% to about 10%.

Now referring primarily to Table 1, which shows a first illustrative example of a particular embodiment of a slurry including an encapsulated thermochromic system having a thermochromic compound (5)(25)(31) which undergoes a thermochromic compound color change from substantially colorless to green upon exposure to a temperature in a range of between about 18° Celsius to about 16° Celsius (about 65° Fahrenheit to about 60° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. As to particular embodiments, the thermochromic compound (5)(25)(31) can remain green even upon discontinuation of exposure to the temperature in a range of between about 16° Celsius to about 18° Celsius, including exposure to temperatures greater than 18° Celsius.

TABLE 1

| Component | Chemical | CAS No. | Percent (%) |
|---|---|---|---|
| Thermochromic compound | Green-1 Pergascript | 34372-72-0 | 0.5-5 |
| Developer | Bisphenol-A | 80-05-7 | 1-10 |
| Solvent(s) | Methyl palmitate | 112-39-0 | 20-35 |
|  | Isopropyl palmitate | 142-91-6 | 1-5 |
| Encapsulation resin | Melamine formaldehyde | 9003-08-01 | 5-20 |
| Aqueous mixture | Water | 7732-18-5 | 40-60 |
|  | Ethylene maleic anhydride | 9006-26-2 |  |

Now referring primarily to Table 2, which shows a second illustrative example of a particular embodiment of a slurry including an encapsulated thermochromic system having a thermochromic compound (5)(25)(31) which undergoes a thermochromic compound color change from substantially colorless to green upon exposure to a temperature in a range of between about 16° Celsius to about 13° Celsius (about 60° Fahrenheit to about 55° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. As to particular embodiments, the thermochromic compound (5)(25)(31) can remain green even upon discontinuation of exposure to the temperature in a range of between about 13° Celsius to about 16° Celsius, including exposure to temperatures greater than 16° Celsius.

TABLE 2

| Component | Chemical | CAS No. | Percent (%) |
|---|---|---|---|
| Thermochromic compound | Green-1 Pergascript | 34372-72-0 | 0.5-5 |
| Developer | Bisphenol-A | 80-05-7 | 1-10 |
| Solvent(s) | Methyl palmitate | 112-39-0 | 20-35 |
|  | Isopropyl palmitate | 142-91-6 | 1-5 |
| Encapsulation resin | Melamine formaldehyde | 9003-08-01 | 5-20 |
| Aqueous mixture | Water | 7732-18-5 | 40-60 |
|  | Ethylene maleic anhydride | 9006-26-2 |  |
| Modifier | Stearyl amide | 124-26-5 | 0.0001-2 |

Now referring primarily to Table 3, which shows a third illustrative example of a particular embodiment of a slurry including an encapsulated thermochromic system having a thermochromic compound (5)(25)(31) which undergoes a thermochromic compound color change from substantially colorless to green upon exposure to a temperature in a range of between about 13° Celsius to about 10° Celsius (about 55° Fahrenheit to about 50° Fahrenheit), whereby this temperature is associated with transfer of a threshold amount of thermal energy (13)(29)(35), the transfer facilitated at least in part by the temperature affector (2), which indicates the insulator (2A) is below a predetermined efficiency threshold. As to particular embodiments, the thermochromic compound (5)(25)(31) can remain green even upon discontinuation of exposure to the temperature in a range of between about 10° Celsius to about 13° Celsius, including exposure to temperatures greater than 13° Celsius.

TABLE 3

| Component | Chemical | CAS No. | Percent (%) |
|---|---|---|---|
| Thermochromic compound | Green-1 Pergascript | 34372-72-0 | 0.5-5 |
| Developer | Bisphenol-A | 80-05-7 | 1-10 |
| Solvent(s) | Methyl palmitate | 112-39-0 | 20-35 |
| | Isopropyl palmitate | 142-91-6 | 1-5 |
| Encapsulation resin | Melamine formaldehyde | 9003-08-01 | 5-20 |
| Aqueous mixture | Water | 7732-18-5 | 40-60 |
| | Ethylene maleic anhydride | 9006-26-2 | |
| Modifier | Tinuvin 400 | 153519-44-9 | 0.0001-2 |

Now referring primarily to Table 4, which shows a fourth illustrative example of a particular embodiment of a slurry including an encapsulated thermochromic system having a thermochromic compound (5)(25)(31) which undergoes a thermochromic compound color change from green (whereby this color can be achieved upon "preactivation" or exposure to a temperature in a range of between about −10° Celsius to about −20° Celsius (about 14° Fahrenheit to about −4° Fahrenheit)) to substantially colorless upon exposure to a temperature above about 25° Celsius (about 77° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. Further, the thermochromic compound (5)(25)(31) remains substantially colorless even upon discontinuation of exposure to the temperature above about 25° Celsius, as the thermochromic compound (5)(25)(31) does not undergo a thermochromic compound color change from substantially colorless to green until exposure to a temperature in a range of between about −10° Celsius to about −20° Celsius. As non-limiting examples, this formulation can be incorporated into a thermochromic efficiency indicator (1) which may be useful for such applications as shown in FIG. 1B, FIG. 1C, and FIG. 1F.

TABLE 4

| Component | Chemical | CAS No. | Percent (%) |
|---|---|---|---|
| Thermochromic compound | Green-1 Pergascript | 34372-72-0 | 0.5-5 |
| Developer | Bisphenol-A | 80-05-7 | 1-10 |
| Solvent(s) | Decanophenone | 6048-82-4 | 20-40 |
| Encapsulation resin | Melamine formaldehyde | 9003-08-01 | 5-20 |
| Aqueous mixture | Water | 7732-18-5 | 40-60 |
| | Ethylene maleic anhydride | 9006-26-2 | |
| Modifier | Tinuvin 400 | 153519-44-9 | 0-2 |

Now referring primarily to FIG. 14B, which shows a first illustrative example of a particular embodiment of a thermochromic efficiency indicator (1) having a thermochromic compound (5)(25)(31) which undergoes a thermochromic compound color change from substantially colorless to a thermochromic compound color (14)(36)(37) upon exposure to a temperature in a range of between about 16° Celsius to about 14° Celsius (about 61 Fahrenheit to about 57° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. Further, the color is retained even upon discontinuation of exposure to the temperature in a range of between about 16° Celsius to about 14° Celsius, as the thermochromic compound (5)(25)(31) does not undergo a thermochromic compound color change from the thermochromic compound color (14)(36)(37) to substantially colorless until exposure to a temperature in a range of between about 24° Celsius to about 27° Celsius (about 75° Fahrenheit to about 81° Fahrenheit). As non-limiting examples, this formulation can be incorporated into a thermochromic efficiency indicator (1) which may be useful for such applications as shown in FIG. 1A, FIG. 1D, and FIG. 1E.

Now referring primarily to FIG. 14C, which shows a second illustrative example of a particular embodiment of a thermochromic efficiency indicator (1) having a thermochromic compound (5)(25)(31) which undergoes a thermochromic compound color change from a thermochromic compound color (14)(36)(37) (whereby this color can be achieved upon "preactivation" or exposure to a temperature in a range of between about 0° Celsius to about −10° Celsius (about 32° Fahrenheit to about 14° Fahrenheit)) to substantially colorless upon exposure to a temperature in a range of between about 30° Celsius to about 40° Celsius (about 86° Fahrenheit to about 104° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. Further, the thermochromic compound (5)(25)(31) remains substantially colorless even upon discontinuation of exposure to the temperature in a range of between about 40° Celsius to about 30° Celsius, as the thermochromic compound (5)(25)(31) does not undergo a thermochromic compound color change from substantially colorless to the thermochromic compound color (14)(36)(37) until exposure to a temperature in a range of between about 00 Celsius to about −10° Celsius. As non-limiting examples, this formulation can be incorporated into a thermochromic efficiency indicator (1) which may be useful for such applications as shown in FIG. 1B, FIG. 1C, and FIG. 1F.

Now referring primarily to FIG. 14D, which shows a third illustrative example of a particular embodiment of a thermochromic efficiency indicator (1) having a thermochromic compound (5)(25)(31) which undergoes a thermochromic compound color change from a thermochromic compound color (14)(36)(37) (whereby this color can be achieved upon "preactivation" or exposure to a temperature in a range of between about 17° Celsius to about 12° Celsius (about 63° Fahrenheit to about 54° Fahrenheit)) to substantially colorless upon exposure to a temperature in a range of between about 27° Celsius to about 35° Celsius (about 81° Fahrenheit to about 95° Fahrenheit), whereby this temperature is associated with transfer of a threshold amount of thermal energy (13)(29)(35), the transfer facilitated at least in part by the temperature affector (2), which indicates the temperature affector (2) is below a predetermined efficiency threshold. Further, the thermochromic compound (5)(25)(31) remains substantially colorless even upon discontinuation of exposure to the temperature in a range of between about 35° Celsius to about 27° Celsius, as the thermochromic compound (5)(25)(31) does not undergo a thermochromic compound color change from substantially colorless to the thermochromic compound color (14)(36)(37) until exposure to a temperature in a range of between about 17° Celsius to about 12° Celsius. As non-limiting examples, this formulation can be incorporated into a thermochromic efficiency indicator (1) which may be useful for such applications as shown in FIG. 1B, FIG. 1C, and FIG. 1F.

As to particular embodiments, the slurry can be further incorporated into a coating or ink, depending upon the application. As to particular embodiments, the coating or ink can be formulated for application to the substrate (3) by printing.

As to particular embodiments, the slurry can be incorporated into an ink selected from the group including or consisting of: screen inks; UV-curable screen inks; flexographic inks; UV-curable flexographic inks; water-based flexographic inks; gravure inks; UV-curable gravure inks; water-based gravure inks; offset inks; UV-cuable wet offset inks; heatset wet offset inks; or the like; or combinations thereof. As a non-limiting example, the slurry can be dewatered and combined with a UV-curable screen ink, whereby the UV-curable screen ink can include a low viscosity mixture of an acrylated monomer and oligomer which is crosslinked via a free radical generating initiator.

Now referring primarily to FIG. 15, which is a schematic view of an illustrative electronic device (48), and computer means, certain network means, and computer readable media which can be utilized to provide a computer-implemented application program (49) which augments the thermochromic efficiency indicator (1) following disposition within in a monitored space (50), whereby the monitored space (50) has a temperature affected by the temperature affector (2).

The electronic device (48) includes a processor (51) communicatively coupled to a memory element (52) containing an application program (49), whereby the application program (49) includes: (i) a graphical user interface module (53) executable to display a graphical user interface (54) on a display surface (55) associated with the electronic device (48); and (ii) an efficiency matching module (56) executable to: (a) allow entry of an indicated efficiency of a temperature affector (2) via the graphical user interface (54), the indicated efficiency indicated by a thermochromic efficiency indicator (1); and (b) display on the display surface (55) one or more options (57) relating to the temperature affector (2), each option (57) matched to the indicated efficiency.

The electronic device (48) can be incorporated into or can include any suitable type of electronic device. As illustrative examples, the electronic device (48) can include a portable electronic device that a user (58) may hold in a hand, such as a digital media player (for example, an iPod® made available by Apple Inc. of Cupertino, Calif.), a personal e-mail device (for example, a Blackberry® made available by Research in Motion of Waterloo, Ontario), a personal data assistant, a cellular telephone, a handheld gaming device, a tablet computer, a digital camera (59), or the like, or combinations thereof. As other illustrative examples, the electronic device (48) can include a larger portable electronic device, such as a laptop computer. As yet another illustrative example, the electronic device (48) can include a substantially fixed electronic device, such as a desktop computer.

As to particular embodiments, the processor (51) can include any processing circuitry or processor operative to control the operations and performance of the electronic device (48). The processor (51) can comprise one central-processing unit (CPU), or a plurality of processing units which operate in parallel to process digital information.

As to particular embodiments, a bus (60) can operably couple components of the electronic device (48), including without limitation the memory element (52) to the processor (51), whereby the bus (60) may have any of several types of bus configurations, including a memory bus or memory controller, a peripheral bus, or a local bus using any of a variety of bus architectures.

The memory element (52) can without limitation be a read-only memory (ROM) (61), a random-access memory (RAM) (62), or both. As to particular embodiments, the electronic device (48) can further include a hard disk drive (63) for reading from and writing to a hard disk (64), a magnetic disk drive (65) for reading from or writing to a removable magnetic disk (66), an optical disk drive (67) for reading from or writing to a removable optical disk (68) such as a CD ROM or other optical media, or the like, or combinations thereof. The hard disk drive (63), magnetic disk drive (65), or optical disk drive (67) can be connected to the bus (60) by a hard disk drive interface (69), a magnetic disk drive interface (70), or an optical disk drive interface (71), respectively.

The drives (63)(65)(67) and their associated computer-readable media provide nonvolatile storage of computer-readable instructions, data structures, program modules, or other data for the electronic device (48). It can be appreciated by those skilled in the art that any type of computer-readable media that can store data which is accessible by the electronic device (48), such as magnetic cassettes, flash memory cards, digital video disks, Bernoulli cartridges, random-access memories (RAMs), read-only memories (ROMs), and the like, may be used in a variety of operating environments.

The electronic device (48) can further include input-output circuitry (72) operative to convert analog signals and other signals into digital data. As to particular embodiments, input-output circuitry (72) can also convert digital data into any other type of signal, and vice-versa. For example, input-output circuitry (72) can receive and convert physical contact inputs (for example, from a multi-touch screen), physical movements (for example, from a mouse or sensor), analog audio signals (for example, from a microphone), or any other input. The digital data can be provided to and received from the processor (51), memory element (52), or any other component of electronic device (48). Several instances of input-output circuitry (72) can be included in one electronic device (48).

As to particular embodiments, input-output circuitry (72) can include display circuitry such as a display surface (55) visible to the user (58). As to particular embodiments, the display circuitry can include a display surface (55) which is incorporated into the electronic device (48), such as a liquid crystal display. As to other particular embodiments, the display circuitry can include a movable display surface (55) which allows display of content remote or discrete from the electronic device (48). As to yet other particular embodiments, the display circuitry can include a coder/decoder (Codec) (73) to convert digital media data into analog signals. For example, the display circuitry (or other appropriate circuitry within electronic device (48)) can include video Codecs, audio Codecs, or any other suitable type of Codec.

The electronic device (48) can include any suitable interface or component for allowing a user (58) to provide inputs to the input-output circuitry (72). For example, the electronic device (48) can include any suitable input interface, as illustrative examples, a keypad (74), a pointing device such as a mouse (75), a left or right mouse button (76), a dial, a click wheel, a touch screen (77), or the like, or combinations thereof. In some embodiments, the electronic device (48) can include a capacitive sensing mechanism, or a multi-touch capacitive sensing mechanism; however, any method or device that converts user (58) action into commands and information can be utilized including, but not limited to: a microphone, a joystick, a game pad, a touch screen, or the like, or combinations thereof.

The electronic device (48) can further include communications circuitry (78) which can include any suitable communications circuitry operative to connect to a communications network and to transmit communications (for example, voice or data) from the electronic device (48) to other devices within a communications network. Communications circuitry (78) can be operative to interface with a communications network (79) using any suitable communications protocol, for example, Wi-Fi (such as, a 802.11 protocol), Bluetooth®, radio frequency systems (such as, 900 MHz, 1.4 GHz, and 5.6 GHz communication systems), infrared, global system for mobile ("GSM") carriers, GSM plus enhanced data rates for GSM ("EDGE"), code division multiple access, quadband, or other cellular protocols, voice over internet protocol ("VoIP"), or any other suitable protocol.

The electronic device (48) can include one more instances of communications circuitry (78) for simultaneously performing several communications operations using different communications networks (79). As to particular embodiments, the electronic device (48) can be operative to connect with one or more server computers (80) through a wide area network ("WAN") (81), such as the Internet. In some embodiments, the communications circuitry (78) can be operative to create a communications network (79) using any suitable communications protocol. For example, communications circuitry (78) can create a short-range communications network using a short-range communications protocol to connect to other devices. For example, communications circuitry (78) can be operative to create a local area network ("LAN") (82) using the Bluetooth® protocol to couple the electronic device (48) with a Bluetooth® headset, or one or more other electronic devices (48).

As to particular embodiments, the electronic device (48) can include an Internet browser (83) such as Microsoft's INTERNET EXPLORER®, GOOGLE CHROME®, MOZILLA FIREFOX®, or the like, which functions to download and render multimedia content that is formatted in "hypertext markup language" (HTML). In this environment, a server computer (80) might be programmed to implement the most significant portions of a graphical user interface (54). As to these embodiments, the application program (49) which implements the graphical user interface (54) can be resident in the server computer (80) (as shown in the example of FIG. 15) and the one or more electronic devices (48) can use the browser Internet browser (83) to simply display downloaded content and to relay user inputs back to the server computer (80). The server computer (80) responds by formatting new screen displays (as shown in the illustrative examples of FIGS. 15 through 22) and downloading them for display on one or more electronic devices (48).

In other embodiments, the server computer (80) can be used primarily as a source of images and data (84), with primary responsibility for implementing the graphical user interface (54) placed upon each electronic device (48) (also shown in the example FIG. 15). As to these embodiments, each of the electronic devices (48) can run the application program (49) implementing the graphical user interface (54), to retrieve images and data (84) from one or more server computers (80). While illustrative examples in this description may attribute a certain type of data to a certain server computer for clarity, it is to be understood that various types of data may reside in one server computer or one type of data can be distributed among a plurality of server computers and embodiments of the invention can to a lesser or greater extent utilize server computers (80). The application program (49) further operates to provide images and data (84) obtained from one or more server computers (80) in a common format.

A basic input/output system (BIOS) (85), containing routines that assist transfer of data between the components of the electronic device (48), such as during start-up, can be stored in ROM (61). A number of program modules may be stored on or included in the hard disk drive (63), magnetic disk (66), optical disk (68), ROM (61), or RAM (62), including an operating system (86) and one or more programs, in particular the inventive application program (49) including a graphical user interface module (53) which implements the graphical user interface (54), as further described herein.

A "click event" occurs when the user (58) operates an application program (49) function through the use of a command, for example a touch on a touch screen (77) or pressing or releasing a left or right mouse button (76) on a mouse (75) while a pointer (87) is located over a control icon (88) (or other interactive field which activates a function) displayed in the graphical user interface (54). However, it is not intended that a "click event" be limited to a touch on a touch screen (77) or the press or release of the left or right mouse button (76) on a mouse (75) while a pointer (87) is located over a control icon (88) (or field), rather, a "click event" is intend to broadly encompass a command by the user (58) through which a function of the application program (49) (or other program, application, module, or the like) can be activated or performed, whether through selection of one or a plurality of control icon(s) (88) or fields, or by user voice command, keyboard stroke, mouse button, touch on a touch screen, or otherwise.

Again referring primarily to FIG. 15 and FIG. 16, as to particular embodiments, the application program (49) can include a graphical user interface module (53) executable to display a graphical user interface (54) on a display surface (55) associated with the electronic device (48). Accordingly, the graphical user interface module (53) can function to display one or a plurality of screen displays (89) on the display surface (55) of the electronic device (48), the screen displays (89) providing images and data (84) which augment use of the thermochromic efficiency indicator (1), as described herein.

As to particular embodiments, the program application (49) can function to generate a screen display (89) in which a user (58) by click event selects the number of indicia (4)(24)(30) observed by viewing the thermochromic efficiency indicator (1) subsequent to monitoring the efficiency of a temperature affector (2), whether no indicia, a first indicia (4), a first and second indicia (4)(24), or a first, second, and third indicia (4)(24)(30), and so forth.

As to particular embodiments, the electronic device (48) may include or be connected to a digital camera (59) capable of capturing an image (90) of the thermochromic efficiency indicator (1) subsequent to monitoring the efficiency of a temperature affector (2) in the monitored space (50), as described herein. Thus, the application program (49) can, but need not necessarily, further include an image recognition module (91) executable to capture the image (90) of the thermochromic efficiency indicator (1); and determine the indicated efficiency of the temperature affector (2) indicated by the thermochromic efficiency indicator (1). For example, the image recognition module (91) can, by click event or an image capture event, function to determine whether the one or more thermochromic compounds (5)(25)(31) included in the respective one or more indicia (4)(24)(30) of the thermochromic efficiency indicator (1) have undergone respective thermochromic compound color changes.

Now referring primarily to FIG. 16, based on the number of indicia (4)(24)(30) or indicated efficiency of the temperature affector (2) selected by the user (58) via interaction with the graphical user interface (54) or recognized by operation of the image recognition module (91), the application program (49) further includes an efficiency matching module (56) executable to allow entry of an indicated efficiency of a temperature affector (2) via the graphical user interface (54), the indicated efficiency indicated by a thermochromic efficiency indicator (1); and display on the display surface (55) one or more options (57) relating to the temperature affector (2), each option (57) matched to the indicated efficiency.

For example, based on the number of indicia (4)(24)(30) or indicated efficiency of the temperature affector (2) selected by the user (58) via interaction with the graphical user interface (54) or recognized by operation of the image recognition module (91), a user-selectable options list (92) can be generated, whereby the user-selectable options list (92) contains one or more options (57) relating to the temperature affector (2), each option (57) matched to the indicated efficiency (shown in the example of FIG. 16 a first indicia (4), a first and second indicia (4)(24), or a first, second, and third indicia (4)(24)(30), and so forth) as indicated by the thermochromic efficiency indicator (1).

Again referring primarily to FIG. 16, as an illustrative example in which the user (58) selects or the image recognition module (91) operates to recognize a first indicia (4) provided by the thermochromic efficiency indicator (1), the efficiency matching module (56) can function to provide a purchasable products icon (93), a store locator icon (94), a do-it-yourself video icon (95) (also referred to as "DIY video icon"), or a contractor icon (96), as but a few non-limiting examples.

Selection by click event of the purchasable products icon (93) generates and displays a purchasable product list (97) corresponding to the search criteria matched by operation of the efficiency matching module (56) to input a particular indicium (4)(24)(30) or indicia (4)(24)(30) provided by the thermochromic efficiency indicator (1). The purchasable product list (97) includes one or more purchasable products (98) matched to the particular indicium (4)(24)(30) or indicia (4)(24)(30) indicating the temperature affector (2) is below a corresponding predetermined efficiency threshold, which may be useful in resolving inefficiencies of the temperature affector (2) in the monitored space (50) typically related to generation of the particular indicium (4)(24) (30) or indicia (4)(24)(30).

Selection by click event of the store locator icon (94) generates and displays a store list (99) or a map (100) of one or more stores (101) offering one or more of the purchasable products (98) displayed by operation of the efficiency matching module (56), which can include store locations (102) of the one or more stores (100).

Selection by click event of the DIY video icon (95) generates and displays a DIY video list (103) of one or more viewable DIY videos (104) corresponding to use of one or more of the purchasable products (98) displayed by operation of the efficiency matching module (56). Additionally or alternatively, the one or more viewable DIY videos (104) can relate to resolving inefficiencies of the temperature affector (2) in the monitored space (50), whereby the inefficiencies correspond to generation of the particular indicium (4)(24)(30) or indicia (4)(24)(30).

Selection by click event of the contractor icon (96) generates and displays a contractor list (105) of one or more contractors (106) which can provide service or installation of the purchasable products (98) or perform the methods taught by the viewable DIY videos (104) relating to resolving inefficiencies of the temperature affector (2) in the monitored space (50), whereby the inefficiencies correspond to generation of the particular indicium (4)(24)(30) or indicia (4)(24)(30).

As an illustrative example in which the user (58) selects or the image recognition module (91) operates to recognize a first indicia (4) provided by the thermochromic efficiency indicator (1), the efficiency matching module (56) can function to provide a purchasable products icon (93), a store locator icon (94), a DIY video icon (95), or a contractor icon (96), as but a few non-limiting examples, each selectable to correspondingly generate and display a purchasable product list (97), a store list (99), a DIY video list (103), and a contractor list (105) identifying one or more corresponding purchasable products (98), stores (101), viewable DIY videos (104), or contractors (106) relating to the search criteria created by operation of the efficiency matching module (56) to recognize the first indicia (4) provided by the thermochromic efficiency indicator (1).

As an illustrative example in which the user (58) selects or the image recognition module (91) operates to recognize a first indicia (4) and a second indicia (24) provided by the thermochromic efficiency indicator (1), the efficiency matching module (56) can function to provide a purchasable products icon (93), a store locator icon (94), a DIY video icon (95), or a contractor icon (96), as but a few non-limiting examples, each selectable to correspondingly generate and display a purchasable product list (97), a store list (99), a DIY video list (103), and a contractor list (105) identifying one or more corresponding purchasable products (98), stores (101), viewable DIY videos (104), or contractors (106) relating to the search criteria created by operation of the efficiency matching module (56) to recognize the first indicia (4) and the second indicia (24) provided by the thermochromic efficiency indicator (1).

As to particular embodiments whereby selection or recognition of a first indicia (4) and a second indicia (24) provided by the thermochromic efficiency indicator (1) corresponds to a lesser indicated efficiency of the temperature affector (2) as compared selection or recognition of only a first indicia (4), the efficiency matching module (56) creates search criteria different than those created when only a first indicia (4) is selected or recognized to return a purchasable product list (97), a store list (99), a DIY video list (103), or a contractor list (105) corresponding to the selected or recognized lesser indicated efficiency of the temperature affector (2), whereby the purchasable product list (97), the store list (99), the DIY video list (103), or the contractor list (105) may be different than those returned when only a first indicia (4) is selected or recognized.

As an illustrative example in which the user (58) selects or the image recognition module (91) operates to recognize a first indicia (4), a second indicia (24), and a third indicia (30) provided by the thermochromic efficiency indicator (1), the efficiency matching module (56) can function to provide a purchasable products icon (93), a store locator icon (94), a DIY video icon (95), or a contractor icon (96), as but a few non-limiting examples, each selectable to correspondingly generate and display a purchasable product list (97), a store list (99), a DIY video list (103), and a contractor list (105)

identifying one or more corresponding purchasable products (98), stores (101), viewable DIY videos (104), or contractors (106) relating to the search criteria created by operation of the efficiency matching module (56) to recognize the first indicia (4), the second indicia (24), and the third indicia (30) provided by the thermochromic efficiency indicator (1).

As to particular embodiments whereby selection or recognition of a first indicia (4), a second indicia (24), and a third indicia (30) provided by the thermochromic efficiency indicator (1) corresponds to a lesser indicated efficiency of the temperature affector (2) as compared selection or recognition of only a first indicia (4) and a second indicia (24), the efficiency matching module (56) creates search criteria different than those created when only a first indicia (4) and a second indicia (24) is selected or recognized to return a purchasable product list (97), a store list (99), a DIY video list (103), or a contractor list (105) corresponding to the selected or recognized lesser indicated efficiency of the temperature affector (2), whereby the purchasable product list (97), the store list (99), the DIY video list (103), or the contractor list (105) may be different than those returned when only a first indicia (4) and a second indicia (24) is selected or recognized.

In the event that the one or more thermochromic compounds (5)(25)(31) included in the one or more respective indicia (4)(24)(30) of the thermochromic efficiency indicator (1) have not undergone respective thermochromic compound color changes, the efficiency matching module (56) operates to display a notice on the display surface (55) indicating that there is no inefficiency associated with the temperature affector (2).

Now referring primarily to FIG. 17, the application program (49) can, but need not necessarily, further include an image annotation module (107) executable to display an annotations field (108) on the display surface (55) associated with the electronic device (48), whereby the annotations field (108) allows entry of one or more annotations (109); and couple the one or more annotations (109) to the indicated efficiency of the temperature affector (2). Following, a user (58) can enter one or more annotations (109) into the annotations field (108) and by click event couple the annotations (109) to the image (90) of the thermochromic efficiency indicator (1).

As but one illustrative example, annotations (109) can include the location and description of the monitored space (50) in which the thermochromic efficiency indicator (1) is or was disposed.

The annotations (109) coupled to the image (90) of the thermochromic efficiency indicator (1) can be retrievably stored in the memory element (52), and upon retrieval, the image (90) of the thermochromic efficiency indicator (1) can be displayed along with the annotations (109), which can be edited by way of insertion or deletion of content.

Now referring primary to FIG. 18, the application program (49) can, but need not necessarily, further include an efficiency report module (110) executable to generate an efficiency report (111) matched to the indicated efficiency of the temperature affector (2).

As to particular embodiments, the efficiency report (111) can include one or more of: the image (90) of the thermochromic efficiency indicator (1), the purchasable product list (97), the store list (99), the DIY video list (103), the contractor list (105), the annotations (109) coupled to the indicated efficiency of the temperature affector (2), or a summary of recommendations relating to the inefficiencies of the temperature affector (2) corresponding to the particular indicium (4)(24)(30) or indicia (4)(24)(30) provided by the thermochromic efficiency indicator (1)

The electronic device (48) can further include an electronic mail program (112) executable to electronically mail the efficiency report (111) to one or more stores (101) or one or more contractors (106), for example over a WAN (81) or a LAN (82).

Figure 3A:
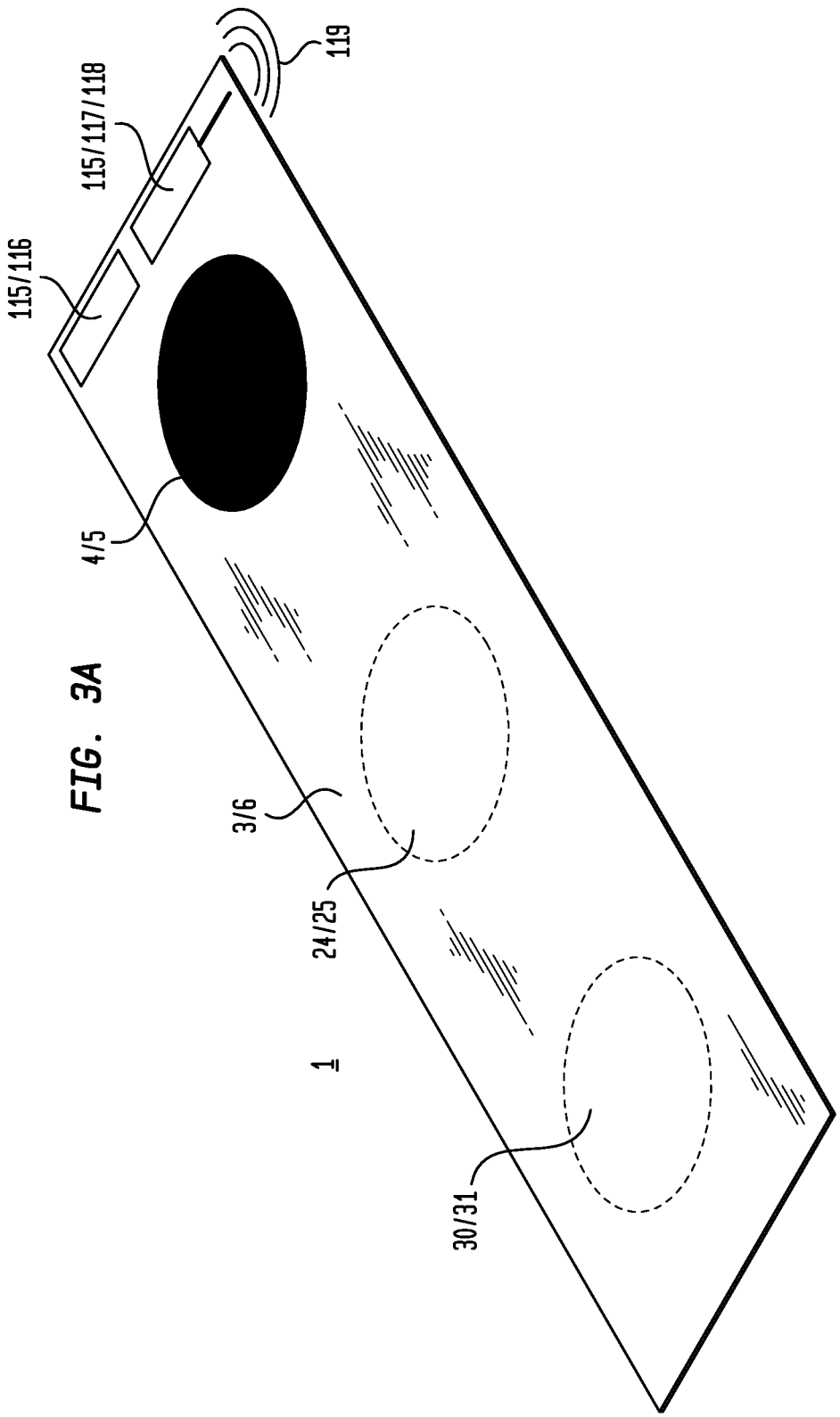
FIG. 3A is a perspective view of a particular embodiment of a thermochromic efficiency indicator.

Now referring primarily to FIG. 15, the application program (49) can, but need not necessarily, further include a thermochromic efficiency indicator database identification module (113) which operates to identify a database (114) associated with a thermochromic efficiency indicator database identifier (115) coupled to a thermochromic efficiency indicator (1) (as shown in the examples of FIG. 2 and FIG. 3).

Each thermochromic efficiency indicator (1) can include, directly or indirectly, a thermochromic efficiency indicator database identifier (115) (also referred to as a "database identifier") capable of being matched to a database (114) contained in one or more server computers (80) which may be unique to that particular database identifier (115) or a group of database identifiers (115).

As to particular embodiments, the database identifier (115) can be a code (119) imprinted on the thermochromic efficiency indicator (1), or other system of words, letters, figures, or other symbols substituted for words or letters or the configuration of the one or more indicia (4)(24)(30), barcodes, or combinations thereof.

As to other particular embodiments, the database identifier (115) can take the form of a radiofrequency identification device (117) or other signal transmission device (118) which transmits a signal (119) transformable by the thermochromic efficiency indicator database identification module (113) to a database identifier (115) capable of being matched to a database (114).

As to yet other particular embodiments, the database identifier (115) can be determined based upon the output from the efficiency matching module (56), or a combination of the above.

As but one illustrative example, a user (58) may obtain a thermochromic efficiency indicator (1) from a store (101) (whether a brick and mortar store, a chain of stores, an Internet store, or a combination thereof). The thermochromic efficiency indicator (1) can be imprinted with a thermochromic efficiency indicator database identifier (115) (as shown in the examples of FIG. 2 and FIG. 3) capable of being matched uniquely with the database (114) associated with the store (101). The store (101) can retrievably store and update the database (114) to include images and data (84) relating to one or more of: purchasable products (98), viewable DIY videos (104), contractors (106), or other information.

The application program (49) can function to generate the screen display (89) as above described in which a user (58) by click event inputs or selects the database identifier (115) and the number of indicia (4)(24)(30) observed by viewing the thermochromic efficiency indicator (1). Alternatively, the database identifier (115) along with the number of indicia (4)(24)(30) can be entered by capture of an image (90) of the thermochromic efficiency indicator (1), as above described. The thermochromic efficiency indicator database identification module (113) can then operate to match the database identifier (115) to the associated database (114), thereby generating one or more of: the purchasable product list (97), the store list (99), the DIY video list (103), or the contractor list (105), including images and data (84) delimited to the identified database (114).

The application program (49) can, but need not necessarily, further include a user identifier matching module (120) executable to associate a user identifier (121) with the thermochromic efficiency indicator (1).

As to particular embodiments, the user identifier matching module (120) can operate to associate a user identifier (121) with one or more of an efficiency report (111) generated, or to purchasable products (98), stores (101), viewable DIY videos (104), or contractors (106) selected by the user (58) from a corresponding purchasable product list (97), store list (99), DIY video list (103), or contractor list (105), as above described.

The use of the thermochromic efficiency indicator (1), the efficiency report (111) generated, selected purchasable products (98), stores (101), viewable DIY videos (104), or contractors (106) can be associated with the user identifier (121) and retrievably stored in one or more of the memory element (52), the server computer (80), or the database (114).

A user (58) or other entity (122) having access to the memory element (52), the server computer (80), or the database (114) can activate the user identifier matching module (120) to generate a user list (121) of a plurality of users (58) associated with a corresponding thermochromic efficiency indicator (1), or to sort the information stored in the memory element (52), the server computer (80), or the database (114) by a purchasable product (98), store (101), viewable DIY video (104), or contractor (106), associated with user identifiers (121), which can be cross-matched to user data (124).

The process detailed above is intended to be illustrative only and not limiting. One of ordinary skill in the art could appreciate that steps of the process discussed herein can be omitted, modified, combined, or rearranged, and any additional steps can be performed without departing from the scope of the invention.

As can be easily understood from the foregoing, the basic concepts of the present invention may be embodied in a variety of ways. The invention involves numerous and varied embodiments of a thermochromic efficiency indicator and methods for making and using such thermochromic efficiency indicators, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "indicator" should be understood to encompass disclosure of the act of "indicating"— whether explicitly discussed or not—and, conversely, were there effectively disclosure of the act of "indicating", such a disclosure should be understood to encompass disclosure of an "indicator" and even a "means for indicating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the thermochromic efficiency indicators herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of using a thermochromic indicator, comprising:
    monitoring a temperature within an interior space of a building with said thermochromic indicator comprising:
        a substrate; and
        a first indicium coupled to said substrate, said first indicium comprising a first thermochromic compound capable of undergoing a reversible first thermochromic compound color change upon exposure to a first temperature which is predetermined to indicate that a temperature affector which affects said temperature does not produce a desired effect;
    wherein said desired effect is the maintenance of said interior space above said first temperature;
    wherein said first thermochromic compound color change is retained even upon discontinuation of exposure to said first temperature to effectively record exposure to said first temperature;
    wherein said first thermochromic compound color change indicates said temperature affector did not produce said desired effect;
    subsequent to monitoring said temperature, capturing an image of said thermochromic indicator with a camera coupled to an electronic device;
    executing one or more non-transitory computer-readable application programs to (i) determine whether said first thermochromic compound underwent said first thermochromic compound color change, (ii) determine whether said temperature affector produced said desired effect, and (iii) provide one or more options directed toward improving said temperature affector when said temperature affector does not produce said desired effect.

2. The method of claim 1, wherein said first thermochromic compound color change is associated with a first thermochromic compound state change from a first thermochromic compound first state to a first thermochromic compound second state;
    wherein said first thermochromic compound state change is achieved upon exposure of said first thermochromic compound to said first temperature.

3. The method of claim 2, wherein said first thermochromic compound in said first thermochromic compound first state is substantially colorless;
    wherein said first thermochromic compound in said first thermochromic compound second state exhibits a first thermochromic compound color; and
    wherein exhibition of said first thermochromic compound color indicates said temperature affector did not produce said desired effect.

4. The method of claim 3, wherein said first indicium is substantially colorless when said first thermochromic compound in said first thermochromic compound first state is substantially colorless;
    wherein said first indicium exhibits a first indicium color when said first thermochromic compound in said first thermochromic compound second state exhibits said first thermochromic compound color; and
    wherein exhibition of said first indicium color indicates said temperature affector did not produce said desired effect.

5. The method of claim 3, wherein said first indicium further comprises a colorant having a colorant color which differs from said first thermochromic compound color exhibited by said first thermochromic compound in said first thermochromic compound second state;
    wherein said first indicium exhibits a first indicium first color comprising a combination of a substantially colorless first thermochromic compound and said colorant color when said first thermochromic compound is in said first thermochromic compound first state;
    wherein said first indicium exhibits a first indicium second color comprising a combination of said first thermochromic compound color and said colorant color when said first thermochromic compound is in said first thermochromic compound second state; and
    wherein exhibition of said first indicium second color indicates said temperature affector did not produce said desired effect.

6. The method of claim 2, wherein said first thermochromic compound is included in a first thermochromic system which additionally includes a first developer and a first solvent.

7. The method of claim 6, wherein said first thermochromic compound comprises a leuco dye.

8. The method of claim 7, wherein said first developer comprises a proton donor.

9. The method of claim 6, wherein said first thermochromic system is encapsulated within microcapsules to provide a microencapsulated thermochromic system.

10. The method of claim 9, wherein said microcapsules have a diameter of not greater than 3 micrometers.

11. The method of claim 9, wherein said microencapsulated thermochromic system is combined with a coating or ink.

12. The method of claim 11, wherein said coating or said ink is formulated for application to said substrate by printing.

13. The method of claim 1, wherein said substrate comprises opposing substrate first and second faces, said substrate first face supporting said first indicia, said substrate second face positionable within said interior space having said temperature which is affected by said temperature affector.

14. The method of claim 13, wherein said substrate second face comprises an adherent layer.

15. The method of claim 14, wherein said adherent layer comprises a removable adhesive.

16. The method of claim 1, wherein said temperature affector comprises an insulator.

17. The method of claim 16, wherein said insulator is selected from the group consisting of: a wall, a floor, a ceiling, a window, a door, insulation, or combinations thereof.

18. The method of claim 1, wherein said first thermochromic compound color change directly indicates said temperature affector does not produce said desired effect.

19. A method of using a thermochromic indicator, comprising:
monitoring a temperature within an interior space of a building with said thermochromic indicator comprising:
a substrate; and
a first indicium coupled to said substrate, said first indicium comprising a first thermochromic compound capable of undergoing a reversible first thermochromic compound color change upon exposure to a first temperature which is predetermined to indicate that a temperature affector which affects said temperature does not produce a desired effect;
wherein said desired effect is the maintenance of said interior space below said first temperature;
wherein said first thermochromic compound color change is retained even upon discontinuation of exposure to said first temperature to effectively record exposure to said first temperature;
wherein said first thermochromic compound color change indicates said temperature affector did not produce said desired effect;
subsequent to monitoring said temperature, capturing an image of said thermochromic indicator with a camera coupled to an electronic device;
executing one or more non-transitory computer-readable application programs to (i) determine whether said first thermochromic compound underwent said first thermochromic compound color change, (ii) determine whether said temperature affector produced said desired effect, and (iii) provide one or more options directed toward improving said temperature affector when said temperature affector does not produce said desired effect.

20. The method of claim 19, wherein said first thermochromic compound color change is associated with a first thermochromic compound state change from a first thermochromic compound first state to a first thermochromic compound second state;
wherein said first thermochromic compound state change is achieved upon exposure of said first thermochromic compound to said first temperature.

21. The method of claim 20, wherein said first thermochromic compound in said first thermochromic compound first state exhibits a first thermochromic compound color;
wherein said first thermochromic compound in said first thermochromic compound second state is substantially colorless; and
wherein exhibition of a substantially colorless first thermochromic compound indicates said temperature affector did not produce said desired effect.

22. The method of claim 21, wherein said first indicium exhibits a first indicium color when said first thermochromic compound in said first thermochromic compound first state exhibits said first thermochromic compound color;
wherein said first indicium is substantially colorless when said first thermochromic compound in said first thermochromic compound second state is substantially colorless; and
wherein exhibition of a substantially colorless first indicium indicates said temperature affector did not produce said desired effect.

23. The method of claim 21, wherein said first indicium further comprises a colorant having a colorant color which differs from said first thermochromic compound color exhibited by said first thermochromic compound in said first thermochromic compound first state;
wherein said first indicium exhibits a first indicium first color comprising a combination of said first thermochromic compound color and said colorant color when said first thermochromic compound is in said first thermochromic compound first state;
wherein said first indicium exhibits a first indicium second color comprising a combination of said substantially colorless first thermochromic compound and said colorant color when said first thermochromic compound is in said first thermochromic compound second state; and
wherein exhibition of said first indicium second color indicates said temperature affector did not produce said desired effect.

* * * * *